COMPUTER STORAGE DATA HANDLING CONTROL APPARATUS

Filed March 16, 1954 10 Sheets-Sheet 1

INVENTORS.
FREDERIC C. WILLIAMS, TOM KILBURN,
DAVID B.G. EDWARDS, GORDON E. THOMAS.
BY.
Stevens, Davis, Miller + Mosher
ATTORNEYS INVENTORS.
FREDERIC C. WILLIAMS, TOM KILBURN,
DAVID B.G. EDWARDS, GORDON E. THOMAS.
BY Stevens, Davis, Miller & Mosher
ATTORNEYS

COMPUTER STORAGE DATA HANDLING CONTROL APPARATUS

Filed March 16, 1954 10 Sheets-Sheet 3

INVENTORS.
FREDERIC C. WILLIAMS, TOM KILBURN,
DAVID B.G. EDWARDS, GORDON E. THOMAS,
BY
Stevens, Davis, Miller & Mosher
ATTORNEYS.

Nov. 17, 1959 F. C. WILLIAMS ET AL 2,913,175

COMPUTER STORAGE DATA HANDLING CONTROL APPARATUS

Filed March 16, 1954 10 Sheets-Sheet 4

INVENTORS.
FREDERIC C. WILLIAMS, TOM KILBURN,
DAVID B. G. EDWARDS, GORDON E. THOMAS
BY Stevens, Davis, Miller & Mosher
ATTORNEYS INVENTORS.
FREDERIC C. WILLIAMS, TOM KILBURN,
DAVID B. G. EDWARDS, GORDON E. THOMAS.
BY
Stevens, Davis, Miller & Mosher
ATTORNEYS.

Nov. 17, 1959 F. C. WILLIAMS ET AL 2,913,175

COMPUTER STORAGE DATA HANDLING CONTROL APPARATUS

Filed March 16, 1954 10 Sheets-Sheet 6

Inventors.
Frederic C. Williams, Tom Kilburn,
David B.G. Edwards, Gordon E. Thomas
By Stevens, Davis, Miller + Mosher
Attorneys.

COMPUTER STORAGE DATA HANDLING CONTROL APPARATUS

Filed March 16, 1954 10 Sheets-Sheet 7

INVENTORS.
FREDERIC C. WILLIAMS, TOM KILBURN,
DAVID B. G. EDWARDS, GORDON E. THOMAS
BY Stevens, Davis, Miller + Mosher
ATTORNEYS.

INVENTORS.
FREDERIC C. WILLIAMS, TOM KILBURN,
DAVID B. G. EDWARDS, GORDON E. THOMAS.
BY
Stevens, Davis, Miller + Mosher
ATTORNEYS.

Nov. 17, 1959 F. C. WILLIAMS ET AL 2,913,175

COMPUTER STORAGE DATA HANDLING CONTROL APPARATUS

Filed March 16, 1954 10 Sheets-Sheet 9

INVENTORS.
FREDERIC. C. WILLIAMS, TOM KILBURN,
DAVID B. G. EDWARDS, GORDON E. THOMAS.
BY.
Stevens, Davis, Miller & Mosher
ATTORNEYS.

Nov. 17, 1959 F. C. WILLIAMS ET AL 2,913,175

COMPUTER STORAGE DATA HANDLING CONTROL APPARATUS

Filed March 16, 1954 10 Sheets-Sheet 10

Inventors.
Frederic C. Williams, Tom Kilburn,
David B.G. Edwards, Gordon E. Thomas.
By. Stevens, Davis, Miller + Mosher
Attorneys.

United States Patent Office 2,913,175
Patented Nov. 17, 1959

2,913,175

COMPUTER STORAGE DATA HANDLING CONTROL APPARATUS

Frederic Calland Williams, Romiley, and Tom Kilburn, Davyhulme, Manchester, England, and David Beverley George Edwards, Tonteg, near Pontypridd, and Gordon Eric Thomas, Port Talbot, Wales, assignors, by mesne assignments, to International Business Machines Corporation, New York, N.Y., a corporation of New York Application March 16, 1954, Serial No. 416,674

Claims priority, application Great Britain March 20, 1953

17 Claims. (Cl. 235—157)

This invention relates to electronic digital computing machines and is more particularly, although not exclusively, concerned with machines utilising data storage devices of the cathode ray tube type as described in patent application Ser. No. 790,879, filed December 12, 1947, by F. C. Williams for Electrical Information Storing Means and in various papers by F. C. Williams and others in Proc. I.E.E., March 1949, part III; February 1951, part II, and subsequently.

In accordance with one aspect of the invention the machine comprises a main data storage device which operates in the parallel mode and computing circuits which operate in the series mode, the digit signalling speed in said series mode computing circuits being several times greater, say ten times greater, than the digit signalling speed employed in the storage device so as to permit the operation of such storage device at a relatively low signalling speed while retaining the advantage of the higher computing speed within said computing circuits.

In accordance with another aspect of the invention the machine comprises, in combination, a multi-unit parallel type cathode ray tube store and a continuously operating signal storage loop including at least one delay device and an adding device for holding, altering and presenting signals which serve to control the address selecting beam motion within such cathode ray tube store during both regeneration and active operational periods. In one form of such arrangement a signal for controlling both the X and Y direction of beam deflection within the store is fed in serial form through a multi-section delay device and this signal, while in transit through such delay device, is simultaneously examined at all of its different digit positions in parallel by appropriate testing of the signals which are currently available at the terminals of the various sections of the delay device.

In accordance with yet another feature of the invention a multi-element delay line device, as referred to above, is utilised as a means for converting serial-form pulse signal trains into parallel-form signals on different signalling leads, or vice versa, by the instantaneous derivation of separate parallel-form signals from the terminals of the various delay elements of said delay line as a pulse train is passing therethrough or, alternatively, by the presentation of simultaneous parallel-form pulse signals to the terminals of the various delay elements of the line.

In order that the above and still further features of the invention may be more readily understood, a description of one form of machine and its manner of organisation and operation will now be given by way of illustration and with reference to the accompanying drawings in which.

Figure 11:
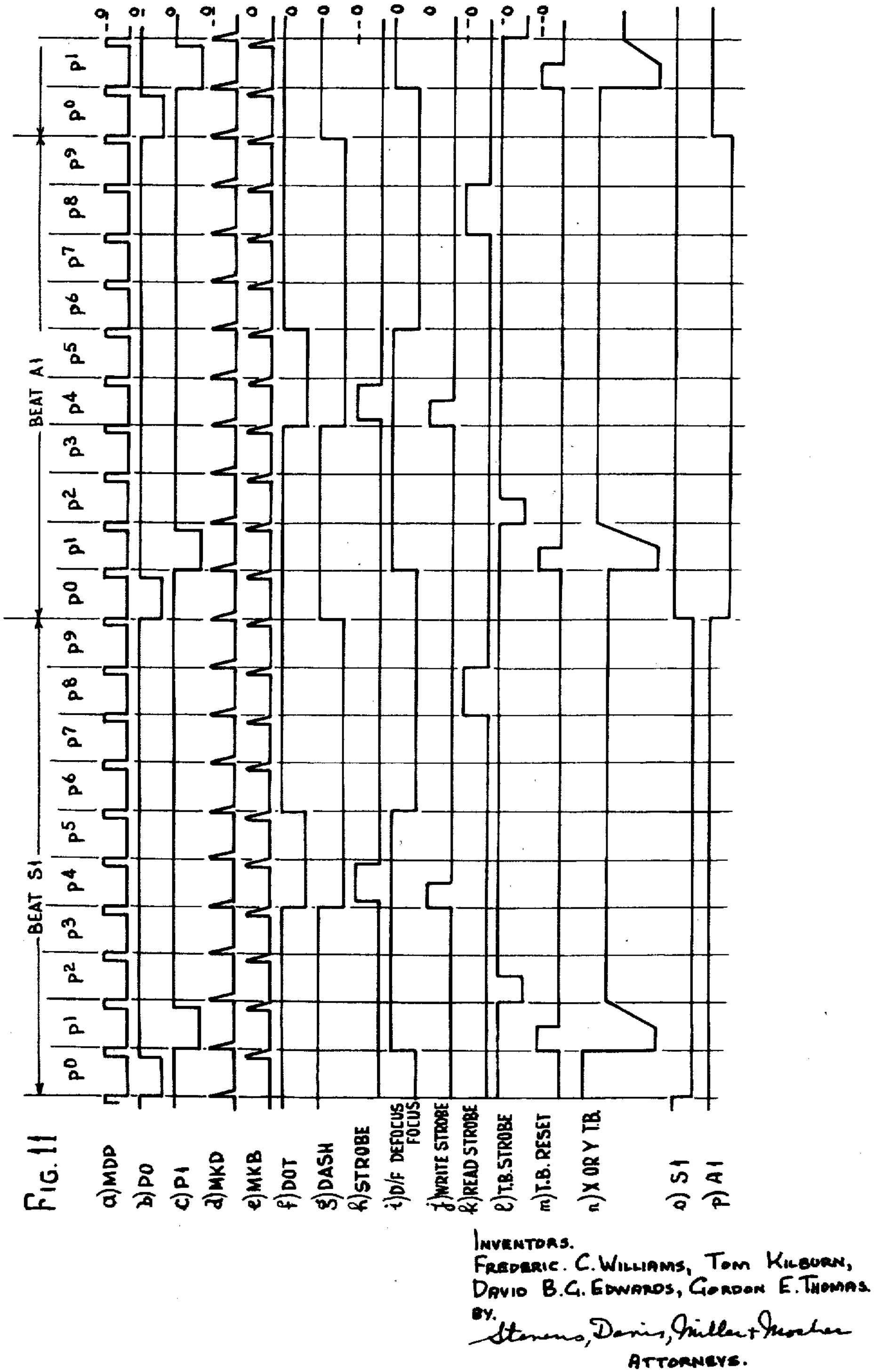

Fig. 11 comprises a series of diagrams illustrating a number of electric waveforms present within the machine.

Figure 12:
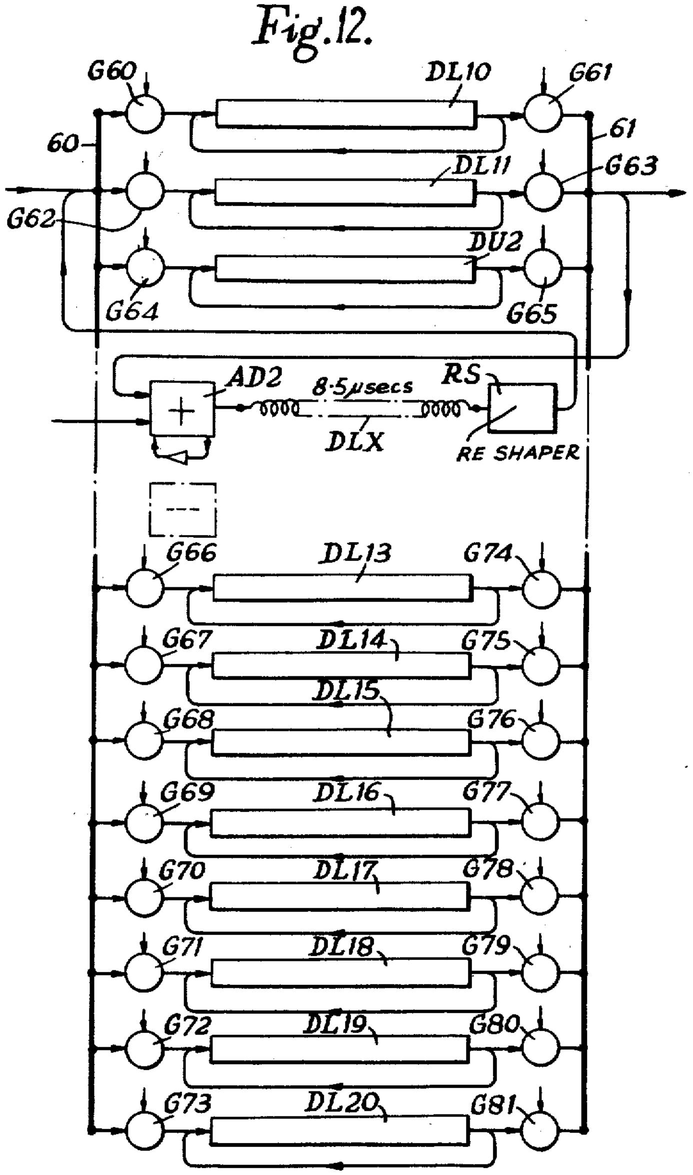

Fig. 12 is a schematic diagram of a modified arrangement for a combined accumulator and B-word store.

The machine operates, within its serial-mode circuits, at a digit signalling speed of one megacycle per second using a basic word length of ten digits, i.e. with each word-representing pulse train comprising ten sequential digit-intervals, each of one microsecond, and within which digit intervals the presence of a negative-going square pulse for the first 9/10 microsecond represents binary value "1" and the absence of any such pulse represents binary value "0." The associated main data storage device, of the cathode ray tube type, operates in the parallel mode at a digit signalling speed of 100 kilocycles per second whereby the time period assigned to the dynamic signalling of one ten-digit word in serial form can be used for effecting the requisite writing, reading or regenerating operations on one stored digit signal in such store. The main data store operates upon at rigid rhythm of alternate scan/action beats each of 10 microseconds duration, regeneration being effected during scan beats and the store being available for writing-in or reading-out during action beats.

The machine being described is of simplified form for ease and clarity of explanation and operates with a rhythm of eight minor cycles or beats S1, A1, S2, A2, S3, A3, S4 and A4 to each major cycle or bar during which one instruction out of the programme of instructions for a required computation is selected and obeyed. In its general organisation with regard to the use of a Control Instruction (CI) for selecting the required Present Instruction (PI) and the possible modification of the latter under the control of a modifying B-word, the present machine bears considerable resemblance to those described in copending applications Ser. No. 165,434, filed June 1, 1950, now Patent No. 2,810,516, by F. C. Williams et al. for Electronic Digital Computing Devices and Ser. No. 226,761, filed May 17, 1951, now Patent No. 2,840,304 by F. C. Williams et al. for Electronic Digital Computing Machines.

Figure 1:
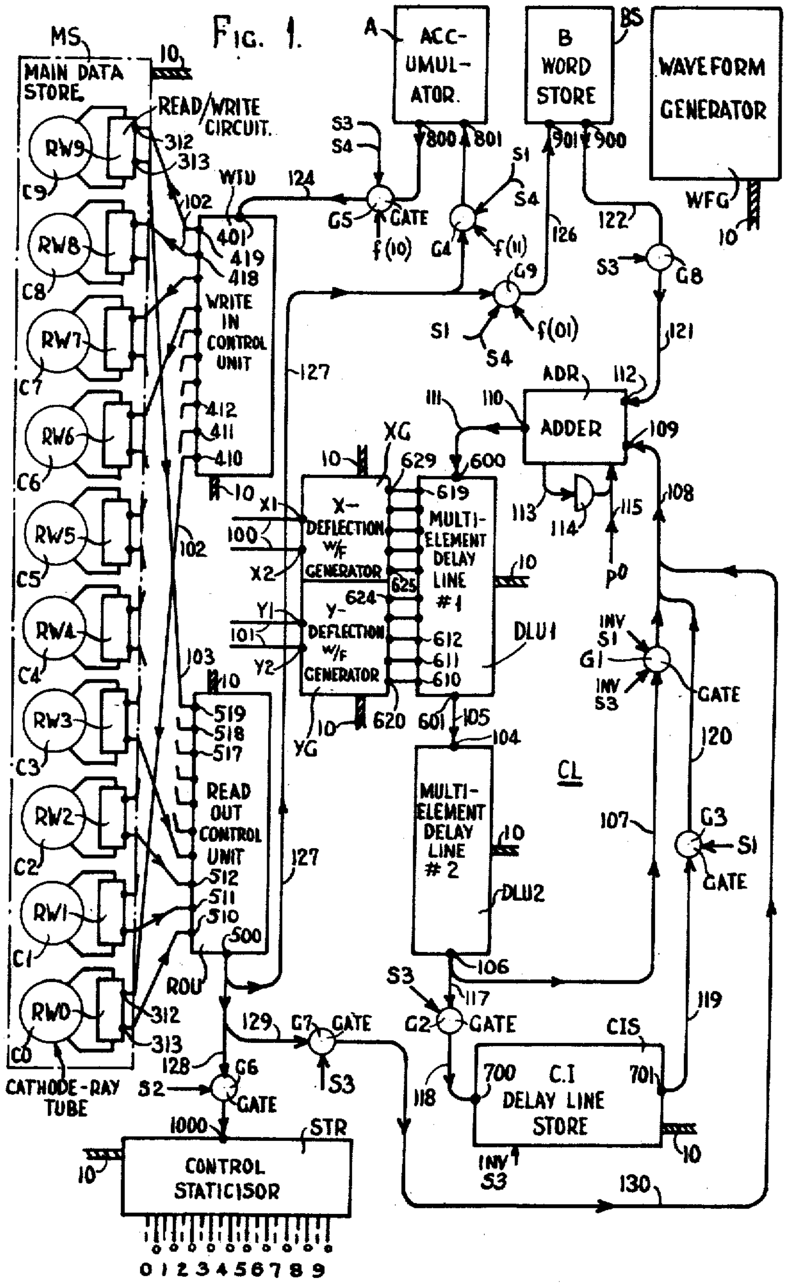
Fig. 1 is a block schematic diagram illustrating the principal elements of the machine including a parallel-mode cathode ray tube main store and its circulating control loop.

Referring now to the block schematic diagram of Fig. 1 the machine comprises a main data store MS including ten separate cathode ray storage tubes C0, C1 . . . C9 each provided with the usual regenerative loop including read/write circuits RW0, RW1 . . . RW9 as described later with reference to Fig. 3. Each of said read/write circuits includes a write input terminal 312 and a read output terminal 313. Each of the tubes is supplied in parallel over leads 100 with an X-deflection waveform from X-deflection waveform generator XG and with a Y-deflection waveform over leads 101 from Y-deflection waveform generator YG whereby the beam of each tube can be caused to bombard a corresponding position within an area of its screen to provide for the storage, in each tube, of one digit of a ten-digit number. By the use of the usual rectangular raster-like pattern of storage positions on each tube screen a total storage capacity of, say, 1,024 ten-digit words may be provided.

A write input control unit WIU has an input terminal 401 for receiving an input signal pulse train and ten output terminals 410, 411 . . . 419 which are connected respectively by leads 102 to the corresponding write input terminals 312 of the circuits RW0 . . . RW9 of the store tubes C0 . . . C9. The write input control unit WIU, which is described in detail later with reference to Fig. 4, comprises a multi-section delay line for receiving a dynamic form input pulse train and providing therefrom appropriate control voltages for effecting writing into a selected location within the main data store MS in accordance with the examined values of the different digit positions in such pulse train.

A read output control unit ROU is similarly provided with ten input terminals 510, 511 . . . 519 which are connected respectively by leads 103 to the read output terminals 313 of the circuits RW0 . . . RW9 associated with the different store tubes C0 . . . C9 in similar order to the write input terminals of the write input control unit WIU. The read output control unit ROU, which is described in detail later with reference to Fig. 5, also comprises a multi-section delay line within which serial pulse train signals are generated in accordance with the output control potentials supplied from the different tubes of the main store MS. The generated pulse train is delivered to an output terminal 500 of the read output control unit.

The waveform (referred to as the XTB waveform) governing deflection of the beam in the X-direction in each of the ten store tubes C0 . . . C9 is provided by X-deflection generator circuit XG whose form will be described in detail later with reference to Fig. 6. Such XTB waveform provides for the positioning of the tube beam in any one of 32 different positions along the X co-ordinate path in accordance with the nature of control potentials applied to five input control terminals 625 . . . 629. A Y-deflection waveform generator YG of substantially identical form similarly provides the YTB waveform for the controlled positioning of each of the tube beams in any one of 32 positions along the Y co-ordinate path in accordance with the control potentials applied to five input control terminals 620 . . . 624.

The control potentials for the terminals 620 . . . 629 of the X- and Y-deflection waveform generator circuits XG and YG are derived from a first delay line device DLU1 whose form will be described in detail later with reference to Fig. 6 and which essentially comprise a multi-section delay line to which pulse train signals are supplied through input terminal 600 and from which such signals subsequently emerge through output terminal 601. The control potentials of the X- and Y-generator circuits are generated in accordance with the instantaneous potentials at different points along the delay line as tested at predetermined time instants during the machine operating rhythm.

A second delay line device DLU2, also comprising a plurality of delay line elements in series, has an input terminal 104, connected to the output terminal 601 of the first delay line device DLU1 by way of lead 105, and an output terminal 106 from which the pulse train signal passing through the line emerges after a predetermined delay time interval.

The delay line devices DLU1 and DLU2 are arranged within a closed control loop CL which includes an adding circuit ADR. This closed loop is formed, under certain conditions, by the lead 107, controlling gate circuit G1 and lead 108 to input terminal 109 of the adding circuit ADR. The output terminal 110 of the adding circuit, which provides a sum-representing pulse signal train, is connected to the input terminal 600 of the first delay line device DLU1 by way of lead 111.

The adding device ADR has a second input terminal 112 and comprises the usual carry digit loop 113 including a one digit-interval delay 114 and arrangements are provided for the insertion, into the carry digit loop of the adding device by way of lead 115, of a pulse signal whose timing is such that it represents unity within the pulse signal trains circulating within the loop CL as will be described later. The total delay or circulation time of the control loop CL is exactly 20 microseconds so that it can contain two 10-digit number signals.

An alternative path to complete the control loop CL is by way of lead 117, controlling gate G2 and lead 118 to input terminal 700 of a CI number store CIS whose form will be described later with reference to Fig. 7. The output terminal 701 of this store is connected by way of lead 119, a further gate G3 and lead 120 to the input terminal 109 of the adding circuit ADR.

The second input terminal 112 of the adding circuit ADR is provided with signals over lead 121, gate G8 and lead 122 from the output terminal 900 of a B-word store BS whose form will be described in detail later with reference to Fig. 9. The B-word store also has an input terminal 901 and signals may be supplied thereto by way of lead 126, gate circuit G9 and lead 127 from the output terminal 500 of the read output control unit ROU.

An accumulator A is also provided. This has an input terminal 801 connected by way of gate circuit G4 to lead 127 and terminal 500 of unit ROU and an output terminal 800 connected through gate G5 and lead 124 to input terminal 401 of unit WIU.

The output terminal 500 of the read-out control unit ROU is also connected by way of lead 128 and gate circuit G6 to input terminal 1000 of a control staticisor STR whose form will be described in detail later with reference to Fig. 10. In the usual way such control staticisor serves to provide a maintained or static potential of appropriate value at each of its different output terminals in accordance with the pulse signal form of the dynamic train supplied thereto at its input terminal.

The output terminal 500 of the read-out control unit ROU is also connected by way of lead 129, gate circuit G7 and lead 130 to the input terminal 109 of the adding circuit ADR.

The rhythmic operation of the machine is controlled by a number of electric waveforms whose nature will be described later with reference to Fig. 11. These are generated within the waveform generator unit WGU whose various outputs are shown collectively in Fig. 1 as a multiple lead 10 to each of the separate units.

Figure 2:
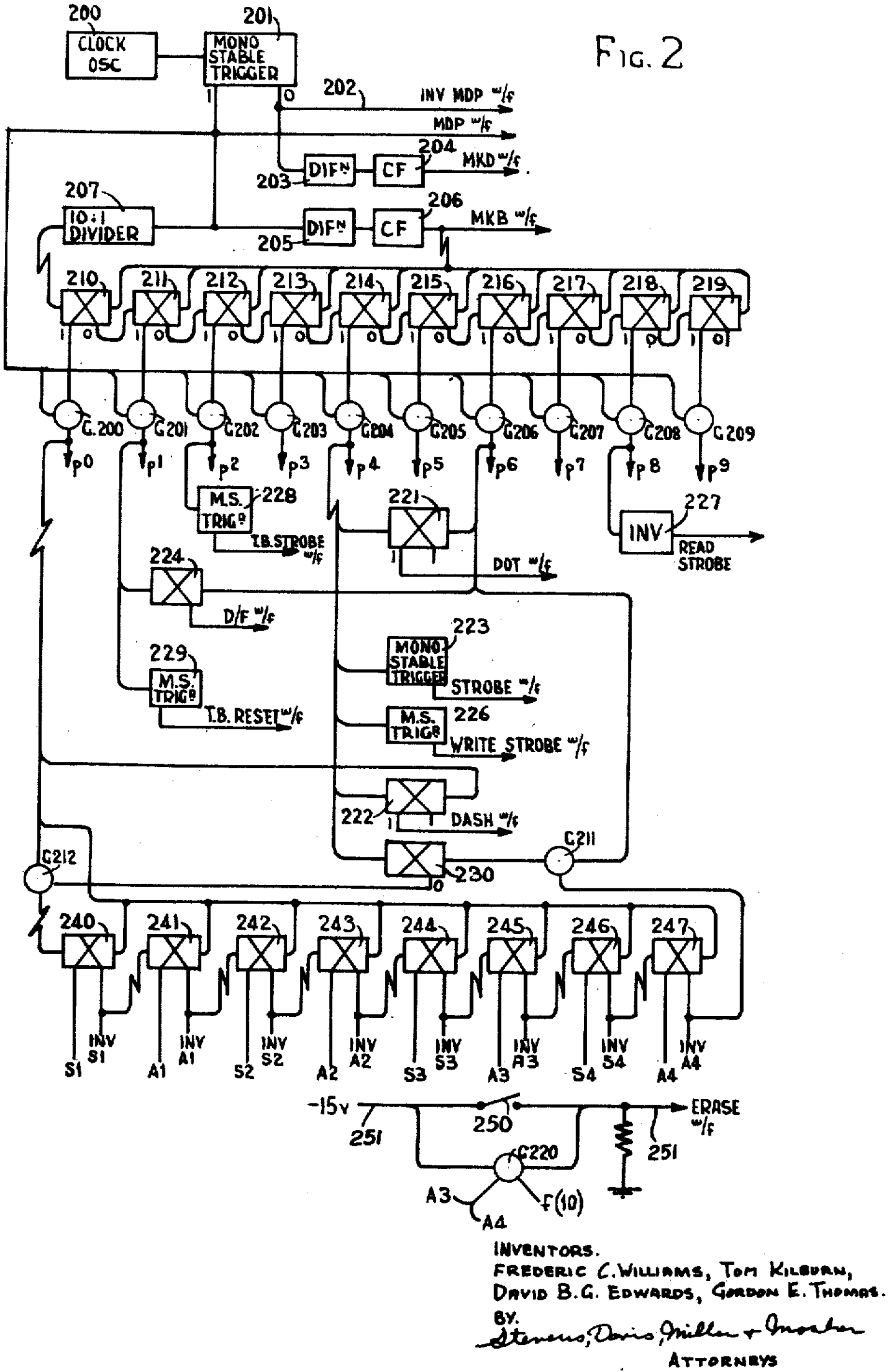
Fig. 2 is a block schematic diagram of the basic waveform generating arrangements.

The various continuous rhythmic waveforms provided in the machine are shown in Fig. 11 and the arrangement for generating these are illustrated schematically in Fig. 2.

Referring to Fig. 2 a stable frequency sine wave oscillator 200 operating at 1M/c.s. provides a synchronizing medium for a mono-stable trigger circuit 201 which is triggered once for each clock oscillation and provides a square pulse output lasting for the first 9/10 of each one microsecond digit period. Two anti-phase outputs are available one of which is shown in Fig. 11*a* and is known as the MDP waveform and comprises a negative pulse during the first 9/10 microsecond of each digit period. The antiphase version, INV MDP available on lead 202 is not shown but comprises a negative-going pulse during the last 1/10 microsecond of each digit period.

The INV MDP waveform is applied through a differentiating circuit 203 and a cathode follower circuit 204 to provide the MKD waveform shown in Fig. 11*d* consisting of a wave whose resting level is normally approximately −20 v, and having a sharp spike positive-going to earth level at the beginning of each digit interval. The MDP waveform is similarly applied to a differentiating circuit 205 and cathode follower circuit 206 to provide the MKB waveform shown in Fig. **11*e*** which also has a resting level of about −20 v. and has a sharp spike positive-going to earth potential level coincident with the trailing edge of each negative-going pulse of the MDP waveform.

The MDP waveform is also applied to a pulse divider circuit 207 having a division ratio of 10:1 and comprising, for instance, one or more divider circuits of the phantastron type as described in Patent No. 2,549,874. Such divider circuit provides an output pulse for every tenth input pulse i.e. at 10 microsecond intervals. Each such reduced-frequency output pulse is used, by its differentiated leading edge to trigger the first of a group of ten bi-stable trigger circuits 210–219 each of which is supplied at its resetting terminal with the MKB waveform, Fig. 11*e*. Such trigger circuits provide two anti-phase outputs one of which (the "1" output) is negative-going during the period when the circuit is triggered and the other of which (the "0" output) is negative-going when the circuit is reset. Such anti-phase outputs are indicated by the sub-scripts 0 and 1. The "0" output of each trigger circuit 210 . . . 218 is differentiated and applied as a triggering medium to the next following circuit 211 . . . 219 whereby as any one trigger circuit is reset it automatically triggers the next one of the series in the manner of the normal binary shifting register. The "1" output of each trigger circuit controls an associated coincidence gate G200 . . . G219 whereby each of such gates are respectively opened in turn during the period of ten successive digit-intervals. Each gate is supplied with the MDP waveform so that, in each digit-interval of each 10-digit beat period, one negative pulse of the MDP waveform is released through one of the gates. The output from the first gate G200 comprises a pulse in the first, *p*0, digit interval of each beat as shown in Fig. 11*b*, the output from the second gate G201 comprises a pulse in the second, *p*1, digit interval as shown in Fig. 11*c* and so on. These *p*-pulse waveforms are employed as in the previous machines described in the aforementioned references for selective examination of the contents of a signal pulse train and for other triggering purposes.

A bi-stable trigger circuit 221 is supplied with the differentiated *p*4-pulse waveform at its triggering input terminal and with the differentiated *p*6-pulse waveform at its resetting terminal to provide the Dot waveform, shown in Fig. 11*f* comprising a square pulse negative-going from earth to −20 v. during the digit intervals *p*4 and *p*5 of each beat. An antiphase version of this Dot waveform from the opposite output terminal of the trigger circuits is also available.

A similar bi-stable trigger circuit 222 is also supplied to the differentiated *p*4-pulse waveform at its triggering input terminal and with the differentiated *p*0-pulse waveform at its reset input terminal to provide the Dash waveform shown in Fig. 11*g* and comprising a square pulse negative-going from earth to −20 v. during the digit intervals *p*4 . . . *p*9 of each beat period. A similar antiphase version of this waveform is also available from the opposite output terminal of the trigger circuit. A further mono-stable trigger circuit 223 is supplied at its triggering input terminal with the differentiated *p*4-pulse waveform. This trigger circuit resets itself automatically after the lapse of rather less than 1 microsecond to provide the Strobe waveform shown in Fig. 11*h* comprising a square pulse positive-going to earth from approximately −20 v. during the *p*4 digit interval of each beat period. A further bi-stable trigger circuit 224 is supplied with the differentiated *p*1-pulse waveform at its triggering input terminal and with the differentiated *p*6-pulse waveform at its resetting terminal to provide the D/F (defocus-focus) waveform of Fig. 11*i*.

A mono-stable trigger circuit 226 is supplied with the differentiated *p*4-pulse waveform at its triggering input terminal. This trigger circuit has an unstable period of ½ microsecond whereby it resets automatically at the end of that time and provides the Write Strobe waveform of Fig. 11*j* comprising a half- microsecond positive-going pulse during the first half of each *p*4 digit interval of each beat. The *p*8-pulse waveform is also applied to an inverter circuit 227 to form the Read Strobe waveform of Fig. 11*k* comprising a positive-going pulse during the *p*8 digit-interval of each beat. A further mono-stable trigger circuit 228 is supplied with the differentiated *p*2-pulse waveform at its triggering input terminal. This trigger circuit has an unstable period of ½ microsecond before resetting automatically and provides the TB Strobe waveform shown in Fig. 11*l* consisting of a negative-going square pulse during the first half of digit interval *p*2 of each beat. A further mono-stable trigger circuit 229 is supplied with the differentiated *p*1-pulse waveform at its triggering input terminal. This trigger circuit also has an unstable period of ½ microsecond before resetting automatically and provides the TB Reset waveform of Fig. 11*m* comprising a positive-going square pulse of ½ microsecond duration during the first half of each *p*1 digit interval of each beat period.

A further bi-stable trigger circuit 230 is supplied with the differentiated *p*4-pulse waveform at its triggering input terminal and with the differentiated *p*6-pulse waveform at its resetting input terminal by way of a gate circuit G211 which is controlled by the INV A4 waveform output of a further trigger circuit 247 referred to later. The "0" output from trigger circuit 230 is arranged to control a gate circuit G212 governing the supply of the differentiated *p*0-pulse waveform to the triggering input terminal of the first trigger circuit 240 of a group of eight bi-stable trigger circuits 240 . . . 247. Each of such trigger circuits is supplied at its reset input terminal with the differentiated *p*0 waveform while the triggering input terminals of the remaining circuits 241 . . . 247 are supplied with the differentiated "0" output of the preceding circuit. The differentiating circuit in the triggering input leads of each trigger circuit is arranged to be of slower time constant than that in the corresponding resetting input lead to ensure that an applied triggering pulse over-rides any nearly coincident reset pulse.

The "1" outputs from the trigger circuits 240 . . . 247 provide respectively the S1, A1, S2, A2, S3, A3, S4 and A4 waveforms of which the S1 and A1 waveforms are shown at Fig. 11*o* and Fig. 11*p* as comprising negative-going pulses extending respectively over the time periods of the S1 and A1 beats. The nature of the other waveforms will be self-evident from their respective legends.

The Erase waveform is provided either by closure of a manual key-switch 250 in a lead 251 connected to a source of negative potential −15 v. or by closure of a gate circuit G220 shunting such switch and controlled by a buffer gate or "or"ed combination of the A3 and A4 waveforms and by a control potential derived from the staticisor STR upon the occurrence of a particular combination of *f* (function) digits main instruction word.

In the foregoing waveform generator arrangements the various elements can be of any convenient form. The mono-stable trigger circuits can be of the form described in M.I.T. Radiation Laboratory Series (published by McGraw-Hill, 1949), vol. 19, pages 179–189, while the bi-stable circuits can be as described in U.H.F. Techniques (published Chapman and Hall, 1942) page 174. The various gate circuits are conveniently of the multiple diode type as described in Electronics, September 1948, page 110, while the differentiating and cathode follower circuits have the conventional form. The inverter 227 can comprise a normal thermionic amplifier valve circuit.

The main data store MS comprises ten similar cathode ray storage tube C0, C1 . . . C9 with their associated read/write circuits RW0, RW1 . . . RW9. The arrangements of the tube C0 and its read/write circuit RW0 are shown in detail in Fig. 3.

Figure 3:
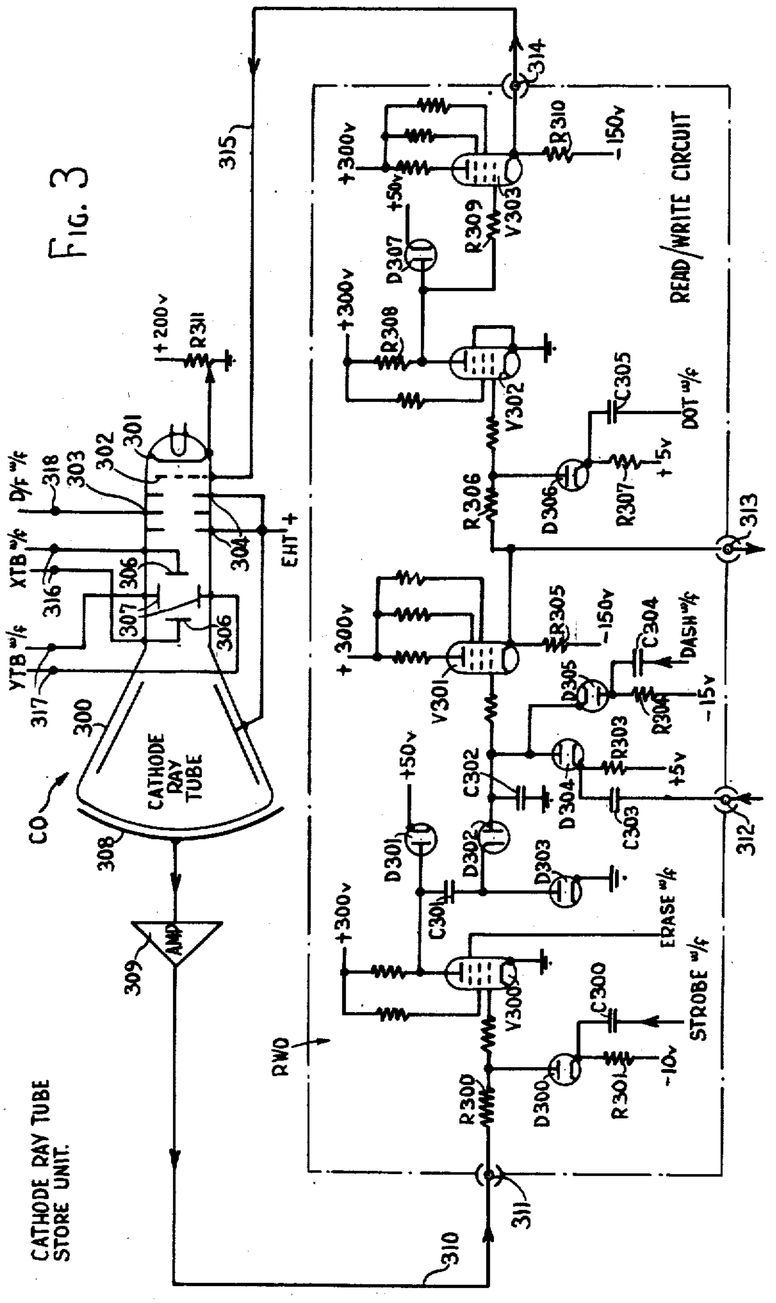
Fig. 3 is a circuit diagram, partly schematic, of one cathode ray tube storage element of the main store.

Referring to Fig. 3, the cathode ray tube 300 has the usual cathode 301, beam modulating electrode 302, second anode 303, first and third anodes 304, X-deflection plates 306, Y-deflection plates 307 and a signal pick-up plate 308 adjacent its fluorescent screen. Cathode 301 is connected to adjustable tapping on potentiometer R311 connected between earth and source of positive potential +200 v. whereby a suitable standing positive bias potential may be applied to said cathode. First and third anodes 304 are connected to a source of suitable positive potential EHT+ while second anode 303 is supplied by way of terminal 318 with the D/F waveform (Fig. 11*i*) from generator WGU by way of multiple lead bus 10 (Fig. 1). X-deflection plates 306 are supplied with push-pull versions of the XTB waveform (Fig. 11*n*) from X-deflection waveform generator XG by way of terminals 316. Y-deflection plates 307 are similarly supplied with push-pull versions of the YTB waveform (Fig. 11*n*) from Y-deflection waveform generator YG by way of terminals 317. The beam modulating electrode 302 is supplied by way of lead 315 with the voltage output from terminal 314 of the associated read/write circuit RW0 described below. Signal pick-up plate 308 is connected to input of amplifier 309 whose output terminal is connected by way of lead 310 to input terminal 311 of the read/write circuit RW0.

The read/write circuit RW0 comprises valve V300 arranged as a normal amplifier with its control grid connected by way of resistor R300 to input terminal 311 and also to anode of diode D300. Cathode of diode D300 is connected through high value resistor R301 to source of negative bias potential −10 v. and is also supplied through capacitor C300 with the Strobe waveform (Fig. 11*h*). The suppressor grid of valve V300 is supplied with the Erase waveform, comprising a potential which is normally at earth level but which can be taken to −15 volts.

Anode of valve V300 is connected to anode of clamp diode D301 whose cathode is connected to source of positive potential +50 v. Such valve anode is also connected through capacitor C301 to anode of further clamp diode D303 and to cathode of blocking diode D302 whose anode is connected to control-grid of valve V301. Cathode of diode D303 is earthed. Valve V301 is arranged as a cathode follower with its cathode connected through load resistor R305 to source of negative potential −150 v. Control grid of valve V301 is connected to one terminal of a capacitor C302 and also to anode of diode D304 and cathode of diode D305. Opposite terminal of capacitor C302 is earthed while cathode of diode D304 is connected by way of resistor R303 to source of positive potential +5 v. and also through capacitor C303 to write input terminal 312 which is supplied with signals from the write-in control unit WIU (Fig. 1). The anode of diode D305 is connected through resistor R304 to source of negative potential −15 v. and is also supplied by way of capacitor C304 with the Dash waveform (Fig. 11*g*).

The cathode output of valve V301 is supplied directly to read output terminal 313. Such cathode output is also fed through resistor R306 to control grid of valve V302 which is arranged as a normal pentode amplifier with its anode connected through load resistor R308 to source of positive potential +300 v. Control grid of valve V302 is also connected to anode of diode D306 whose cathode is connected through resistor R307 to source of positive potential +5 v. and is also supplied by way of capacitor C305 with the Dot waveform (Fig. 11*f*).

Anode of valve V302 is directly connected to anode of clamp diode D307 and also by way of resistor R309 to control-grid of valve V303. Cathode of clamp diode D307 is connected to source of positive potential +50 v. Valve V303 is arranged as a cathode follower with its cathode connected through load resistor R310 to source of negative potential −150 v. The cathode output from valve V303 is applied to output terminal 314.

The general construction and manner of operation of such cathode ray tube store is substantially identical with that described in copending application Ser. No. 124,192, filed October 28, 1949 by F. C. Williams et al. for Electrical Information Storage Apparatus and in the aforesaid Proc. I.E.E. reference, March 1949 to which reference should be made for greater detail. The manner of operation, in the present instance, is briefly as follows. Storage of binary digital values "0" or "1" is effected by the known "defocus-focus" method as described in the above quoted reference. By the conjoint action of the XTB and YTB waveforms (Fig. 11*n*) upon the deflecting plates 306, 307, the tube beam may be directed to any one of 32 discrete positions in any one of 32 separate lines of a television type raster thus affording a total of 1024 separate storage locations. Under the influence of the D/F waveform (Fig. 11*i*), the tube beam, if turned on, will be in defocused condition during digit interval *p*1—*p*5 of each beat and in focused condition during the remaining digit intervals *p*6—*p*9 of that beat and in the first digit interval *p*0 of the following beat. As will be explained later, the tube beam may be turned on either for the period of the negative-going pulse of the Dot waveform (Fig. 11*f*) or for the longer period of the negative-going pulse of the Dash waveform (Fig. 11*g*). In the former case the beam is turned on only whilst it is in defocused condition and as explained in the quoted references, one form of charge state, representative of binary value "0," is set up upon the tube screen. Such charge state, upon subsequent bombardment by the beam, provides an output signal which, after amplification in amplifier 309, has an initial transient of negative polarity. In the other case, where the beam is first turned on whilst in defocused condition and is maintained on after it has been altered to the focused condition, there will be set up upon the tube screen a different charge state, representative of binary value "1." This second charge state, upon subsequent bombardment by the beam, provides an output signal from amplifier 309 having an initial transient of positive polarity. Such transients will occur immediately subsequent to the commencement of digit interval *p*4 of each beat and are examined by the positive-going pulses of the Strobe waveform (Fig. 11*h*) to control the read output signal formation and regeneration by the unit RWO as follows.

Valve V300 is normally held cut off at its control grid by the −10 v. bias potential through resistor R301 and diode D300 and by the normal resting level of the output from amplifier 309 at terminal 311 being at approximately −15 v. The arrival at terminal 311 of a negative-going transient (representing value "0") has no effect upon the cut-off state of valve V300 as the positive pulse of the Strobe waveform (Fig. 11*h*) is blocked by diode D300. The anode potential of valve V300 remains high and following valve V301 is maintained in its normal fully turned on state in the absence of any input signal at termnal 312. The potential at read output terminal 313 remains unaltered at its normal, approximately earth, potential. The resultant potential at the cathode og valve V301 holds valve V302 full on except during the negative pulse periods of the Dot Waveform applied through diode D306. During these Dot pulse periods valve V302 is cut off and the raised anode potential thereof, caught at +50 v. by diode D307 is cathode followed by valve V303 to provide a positive-going pulse to the beam controlling electrode 302 of the tube 300 during digit intervals *p*4, *p*5. This produces regeneration of the previous charge state.

If the arriving transient at terminal 311 is positive-going (indicative of value "1"), the coincident positive pulse of the Strobe waveform turns valve V300 full-on and, assuming the Erase waveform is at its normal, ineffective, level of earth potential, the falling anode potential is transmitted as a negative pulse through capacitor C301 and diode D302 to cut off valve V301 at its control grid and to charge capacitor C302 negatively. The Dash waveform (Fig. 11*g*) is at this time, negative-going, so that valve V301 remains cut-off until the end of digit interval *p*9 when the positive-going edge of the Dash pulse discharges capacitor C302. In consequence of the lowered cathode potential of valve V301, valve V302 which is initially cut-off by the Dot pulse (Fig. 11*f*), remains cut-off until the end of the Dash pulse and the corresponding positive pulse supplied from the cathode of valve V303 to the electrode 302 of the tube is lengthened to produce the second charge state. The read output signal at terminal 313 comprises, in such circumstances, a negative pulse corresponding to the negative Dash pulse during digit-intervals *p*4—*p*9.

To effect writing-in of signals, these are applied to terminal 312 whilst an Erase potential, sufficient to cut-off valve V300, is supplied to the suppressor grid of that valve. Under such conditions, the maintenance of terminal 312 at its normal earth potential will not affect valve V301, turned on as already described and the beam modulating electrode 302 of the tube 300 will be supplied only with the Dot waveform pulse to set up the first or "0" representing charge state on the tube screen. If, on the other hand, a negative-going pulse is applied to terminal 312 at any time during digit-intervals *p*4, *p*5, the resultant cutting-off of valve V301 and charging of capacitor C302 will cause the modulating electrode 302 of the tube 300 to be supplied with the Dash waveform pulse to set up the second or "1" representing charge state on the tube screen.

The remaining nine units C1, C2 . . . C9 and their associated read/write circuits are similar, the tube beams being deflected in unison by the XTB and YTB waveforms applied in parallel to each tube together with the D/F waveform.

Figure 4:
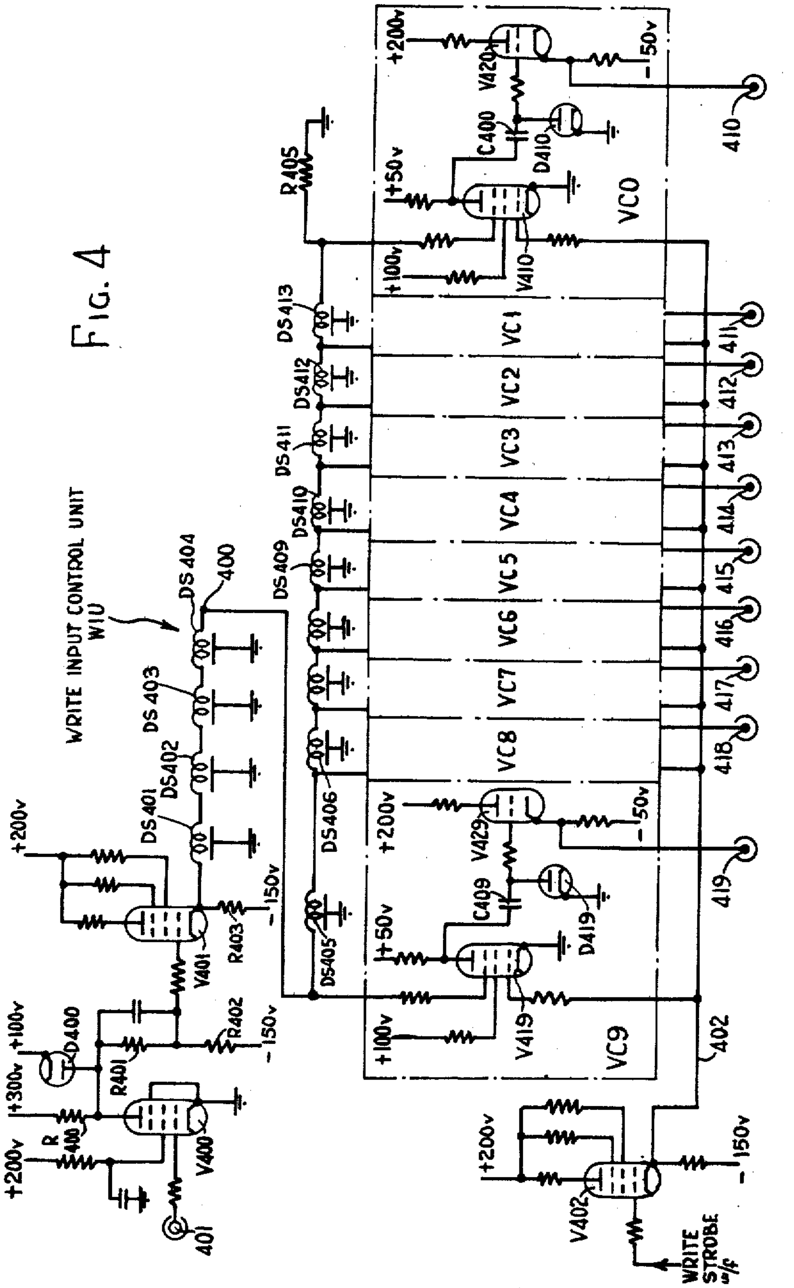
Fig. 4 is a circuit diagram showing the arrangements of the write input control unit for the main store.

The circuit of the write input control unit WIU is shown in Fig. 4 and comprises a first valve V400 having its control grid connected to input terminal 401. The valve is arranged as a pentode amplifier with its anode connected to source of positive potential +300 v. by way of load resistor R400 and also to the anode of clamp diode D400 whose cathode is connected to a source of positive potential +100 v. The anode of valve V400 is also D.C. connected through potentiometer network of resistors R401, R402 to the control grid of a second valve V401.

Valve V401 is arranged as an anode follower having its cathode connected by way of load resistor R403 to source of negative potential −150 v.

The cathode output terminal of valve V401 is connected to one end for four series-connected delay line sections DS401, DS402, DS403 and DS404. These delay line sections are of the so-called "distributed capacitive" type comprising a suitable inductive winding upon either a metallic core or, more preferably, upon a metal coated insulating rod, such core or coating being connected to earth to constitute the opposite electrode of the capacitive elements of the line in well known manner. The first three sections DS401 . . . DS403 each have a delay time of 1 microsecond but the fourth section DS404 has a delay time of only ¾ microsecond.

The end point 400 of the fourth delay line section DS404 is connected to one end of a further series of nine delay line sections DS405 . . . DS413. These delay line sections are of similar form to those of sections DS401 . . . DS404 and have a delay time of 1 microsecond per section. The end terminal of the last section DS413 is connected to earth through a load matching resistor D405.

The input terminal of the delay line section DS405 is connected to the suppressor grid of a pentode valve V419 arranged as an amplifier. The control grid of this valve V419 is connected to lead 402. The anode of valve V419 is coupled by way of capacitor C409 to the control grid of triode valve V429. Such control grid is also connected to the anode of a clamp diode D419 whose cathode is earthed. Valve V429 is arranged as a cathode follower having its cathode output point connected to write output terminal 419.

Each of the intermediate junction points between the nine delay line sections DS405 . . . DS413 and the end terminal of section DS413 are connected to separate individual valve circuits VC8 . . . VC0 identical with that of circuit VC9 described above with reference to valves V419 and V429 but for clarity only that of circuit VC0 connected to the end terminal of the last section DS413 is shown in full.

The lead 402 is connected to the cathode of a valve V402 which is arranged as a cathode follower with its control grid supplied with the Write Strobe waveform (Fig. 11*j*).

The operation of such write input control unit WIU is as follows. The form of the serial pulse train arriving over lead 124 from the accumulator A (Fig. 1) is one having a pulse repetition frequency of 1 megacycle per second and wherein binary "1" value digits are represented by a negative pulse of −20 v. amplitude for the first $\frac{9}{10}$ microsecond of each 1 microsecond digit period whereas binary "0" value digits are represented by the absence of any such pulse, the normal resting level of the waveform being at approximately earth potential or slightly above earth potential, say, between +3 and +5 v.

Valve V400 operates as a normal voltage amplifier, being turned full-on whilst the input waveform at terminal 401 is at its normal resting level (representative of binary value "0") and being cut-off when any input negative pulse (representative of binary value "1") is present at such terminal 401.

The anode output voltage of valve V400, which is low under binary "0" conditions and is raised to +100 v., at which it is caught by diode D400, under binary "1" conditions, is applied to the control grid of valve V401 through the network of resistors R401 and R402 which are of such value that the control grid of valve V401 normally rests at −30 v. for binary value "0" conditions and rises to approximately +5 v. for binary value "1" conditions. The cathode output potentials of valve V401 are of similar order and are fed into the delay line sections DS401 . . . DS404 and from thence into the main group of delay line sections DS405 . . . DS413.

After a sufficient length of time has elapsed following the application of a 10-digit representing pulse train to terminal 401, the corresponding output potentials developed at the cathode of valve V401 will be present in and spaced out along the delay line sections DS405 . . . DS413. Thus, assuming a group of alternate "1" and "0" value signals are applied to terminal 401, at a time 15 microseconds later, the output tapping points along the delay line sections DS405 . . . DS413 which are connected to the suppressor grids of valves V410 . . . V419 will be alternately high (i.e. at about earth level) and low (i.e. at about −30 v.).

Valve V402 supplied with the Write Strobe waveform is normally cut off by the resting level of such waveform at −40 v. and under such conditions the potential on lead 402 is correspondingly lowered to an extent sufficient to cut off each of the valves V410 . . . V419 at its control grid. Upon the arrival of the positive-going pulse of the Write Strobe waveform (Fig. 11*j*) valve V402 is turned on and its cathode potential accordingly rises to above earth potential level and thereby turns on each of the valves V410 . . . V419 at its control grid. If any of such valves V410 . . . V419 is, at this instant, also turned on at its suppressor grid by reason of the interconnected point on the delay line DL1 being at the raised or binary "1" indicating level of earth potential or above, that valve will conduct to its anode and the anode output potential, normally at +50 v. will fall abruptly to provide a negative pulse output, lasting for the duration of the Write Strobe pulse, to the associated cathode follower valve V420 . . . V429 with the consequential development of a corresponding negative-going output pulse at the interconnected one of the output terminals 410 . . . 419. If, on the other hand, at the instant of turning on of any valve of the group V410 . . . V419, such valve has its suppressor grid connected to a tapping point on the delay line sections DS405 . . . DS413 which is at the lowered or binary "0" indicating level, then such turning on of the valve at its control grid will be ineffective to change the anode potential thereof which will remain high and will result in no output pulse being developed for application to the associated cathode follower valve whose cathode output accordingly remains at approximately earth potential. The resultant output potentials from terminals 410 . . . 419 accordingly comprise a negative-going pulse equal in duration to the Write Strobe pulse and in time coincidence therewith if the potential at the interconnected tapping point on the delay line sections is indicative of binary value "1" and a sustained earth potential level if such delay line tapping point is at the binary value "0" level. Such "1"-representing output potential pulses from the respective terminals 410 . . . 419 are "flashed over" to the related one of the write input terminals 312 of the ten cathode ray storage tube devices where, by their arrival at digit interval *p*4 of the beat period, they operate to charge capacitor C302 (Fig. 3) and thus cause the setting up of the second or "1"-representing charge state on the tube screen as already described.

Figure 5:
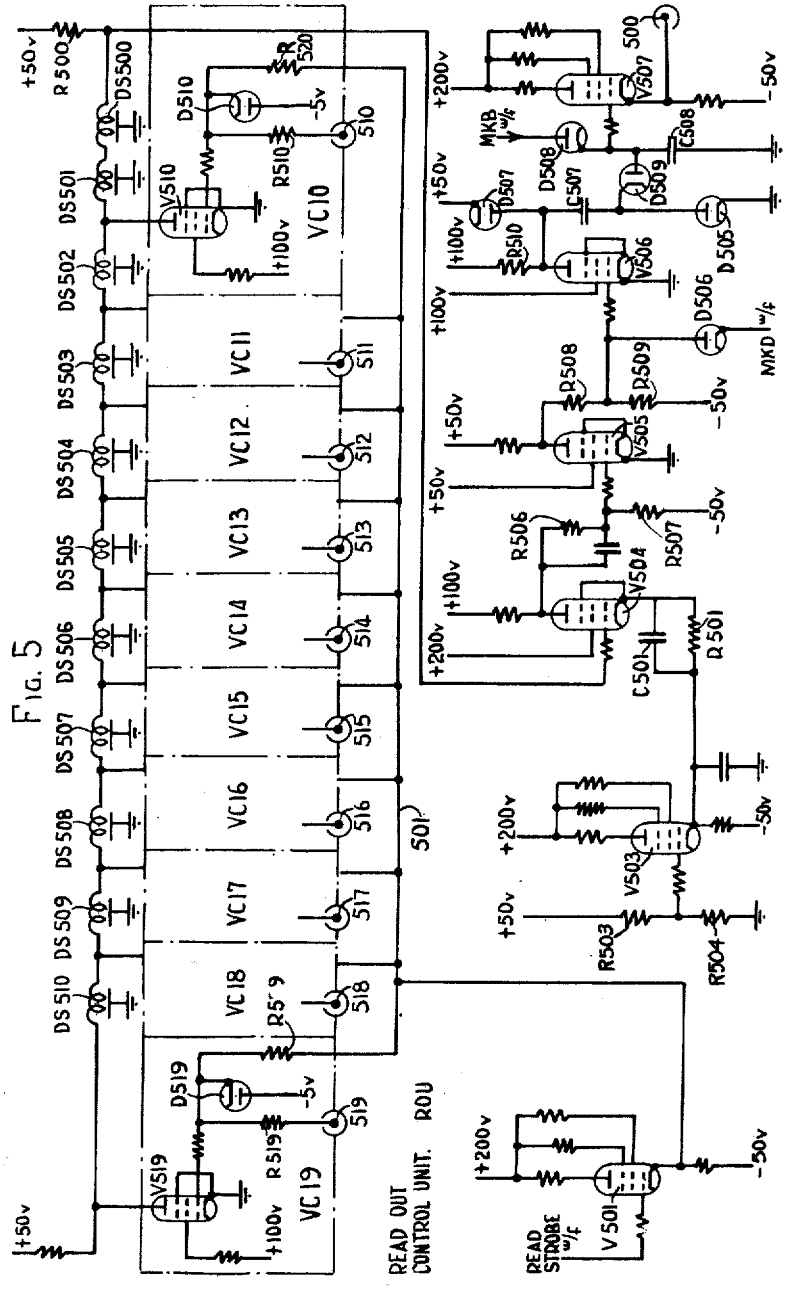
Fig. 5 is a similar circuit diagram showing the arrangements of the read output control unit for the main store.

The circuit arrangements of the read out control unit ROU are shown in Fig. 5 and comprise a group of nine separate delay line sections DS502, DS503 . . . DS510 connected in series, each element being of a form similar to that already described with reference to Fig. 4 and each having a delay time of 1 microsecond. Each end terminal point of the group and each intermediate tapping point between adjacent delay line sections thereof is connected to the anode of an associated one of a group of ten pentode valves V510 . . . V519.

Referring now particularly to the circuit VC19 of valve V519 it will be seen that the valve is arranged as an amplifier having its cathode and its suppressor grid earthed and its control grid connected through resistor R519 to an input terminal 519. Such control grid is also connected to the cathode of a clamp diode D519 whose anode is connected to a source of negative potential −5 v. Such control grid is also connected by way of resistor R529 to a lead 501 carrying a control voltage waveform derived from the circuit of valve V501.

Similar circuits VC10, VC11 . . . VC18 are provided for connection one to each of the junction points between the delay line sections and to the end terminal of section DS502. These circuits have associated input terminals 510 . . . 518 and are not shown in full except the opposite end circuit VC10 comprising valve V510 and diode D510. Each is connected to the control voltage lead 501.

Valve V501 is arranged as a cathode follower stage, its control grid being supplied with the Read Strobe waveform (Fig. 11*k*) and its cathode being joined to the aforesaid control voltage lead 501.

The end terminal of delay line section DS502 is also joined to two further series connected delay line sections DS501 and DS500 which are respectively of 1 microsecond and 0.5 microsecond delay times. The output end of the second further delay section DS500 is connected to a source of positive potential +50 v. by way of resistor R500 and is also connected to the control grid of a pentode valve V504. This valve V504 is arranged as a voltage amplifier with its cathode connected by way of a parallel time constant circuit of capacitor C501 and resistor R501 to the cathode of a valve V503 arranged as a cathode follower stage having its control grid connected to a tapping on a potentiometer network of resistors R503, R504 and acting to provide a source of stabilised positive potential.

The anode of valve V504 is D.C. coupled to the control grid of valve V505 by way of a potentiometer network of resistors R506 and R507. Valve V505 is also arranged as a voltage amplifier having its anode similarly D.C. coupled by way of potentiometer network R508, R509 to the control grid of a further valve V506.

Valve V506 and a further valve V507 constitute a pulse reshaping circuit and are arranged with the cathode of valve V506 and its suppressor grid connected to earth while its control grid, in addition to connection to valve V505, is also connected to the anode of a diode D506 whose cathode is supplied with the MPD waveform (Fig. 11*d*). The anode of valve V506 is connected by way of load resistor R510 to a source of positive potential +100 v. and is also connected to the anode of a clamp diode D507 whose cathode is connected to positive potential source +50 v.; such anode is also coupled by way of capacitor C507 to the cathode of a blocking diode D509 and to the anode of clamp diode D505. Diode D505 has its cathode connected to earth while the anode of diode D509 is connected to the control grid of valve V507 and also to the cathode of a further diode D508 whose anode is supplied with the MKB waveform (Fig. 11*e*). A capacitor C508 is connected between the control grid of valve V507 and earth. Valve V507 is arranged as a cathode follower and has its cathode output joined to output terminal 500.

The operation of the read output control unit ROU is as follows. The potentials at the input terminals 510, 511 . . . 519 will be those of the related read output terminals 313 of the associated read/write circuits RW of the main store MS described with relation to Fig. 3. Such store output terminals will, at the time of digit-interval *p*8 in each beat, either be at or around about earth potential representative of a read-out signal of binary value "0" or at about −20 v. representing a read-out signal of binary value "1."

Each of the read out valves V510 . . . V519 is normally held cut-off by the bias potential applied over lead 501 from the cathode of valve V501 when the resting level of the Read Strobe waveform (Fig. 11*k*) is effective at the control grid of valve V501.

When any one of the read-out valves V510 . . . V519 has the (earth level) potential representing a "0" digit output signal from store MS applied to its related input terminal 510 . . . 519, the raising of the bias potential on lead 501 during the positive-going pulse period of the Read Strobe pulse waveform, which occurs during the digit-interval *p*8 of the beat period, will turn on the associated read-out valve. For example, an output "0" digit signal from cathode ray tube store C0 will provide an earth potential at terminal 510 through resistor R510 so that when the bias potential on lead 501 is raised from its normal level of about −20 v. to earth level the valve V510 will be turned on. Similarly with any of the other valves V511 . . . V519 under the control of their related store input terminals 511 . . . 519. The resultant potential fall at the valve anode causes a corresponding fall of potential at the related point of the delay line network and as such fall persists for the period of the Read Strobe pulse, i.e. 1 microsecond, it is the equivalent of the insertion of a negative-going pulse into the line. If, on the other hand, any of said read out valves V510 . . . V519 have their related input terminals 510 . . . 519 supplied with a "1" representing, i.e. negative, potential of −20 v., from the related cathode ray tube store, the above described raising of the bias potential level on lead 501 during the Read Strobe pulse period will be ineffective to turn on the valve with the result that the original higher anode potential will be maintained at that particular point or those particular points along the delay line. There is thus generated within the delay line of sections DS502 . . . DS510 a serialised pulse train representative of the parallel form output from the cathode ray store tubes C0 . . . C9. Such pulse train is, it will be noted, of reversed form to that used in the rest of the machine inasmuch as a negative pulse in the line represents binary value "0" and the absence of any such negative pulse represents binary value "1." This generated pulse train will travel along the line in the usual way and will eventually emerge pulse by pulse through the further delay line sections DS501 and DS500 after an additional delay of 1½ microseconds.

The output pulse train signals emerging from the delay line section DS500 are applied to the control grid of valve V504. Valve V504 has its cathode maintained at a steady potential through the action of the stabiliser valve V503, such that such valve V504 is normally turned on when the line potential is at its higher value (representative of binary value "1") and is cut-off whenever the line output is at its lower or negative-going value (representative of binary value "0").

Taking first the case of a "0" representing (negative) line output signal, valve V504 is cut-off thereby, thus producing a positive rise of potential at its anode which is transmitted to the control grid of valve V505 which is normally in the condition of being fully cut off by the negative bias applied to its control grid through the potentiometer network of resistors R506, R507. Valve V505 is thus turned on to produce a negative-going output from its anode for application to the control grid of valve V506.

Valve V506 is normally biased to its cut-off point by the negative resting level of the MKD waveform (Fig. 11*d*) applied through diode D506 and can only be turned on when such MKD waveform moves positively during the sharp spike period at the end of each digit interval. When the potential at the tapping point on the potentiometer network of resistors R508 and R509 is lowered by reason of the negative-going output from the anode of valve V505, the aforesaid positive-going pulses of the MKD waveform are ineffective to turn on the valve and as a result no change of voltage occurs at the anode of valve V506 in response to such pulse. In consequence the control grid of valve V507 remains at its normal, approximately, earth, level as does also the potential at the output terminal 500.

In the case of a "1" representing line output signal from delay line section DS500 whereby valve V504 is kept fully turned on, the resultant lowered anode potential maintains valve V505 fully turned off and this in turn maintains a raised potential at the anode of the valve sufficient to bring the tapping point between resistors R508 and R509 up to a level such that a positive-going spike of the MKD waveform applied through diode D506 operates to turn on valve V506 at the beginning of the digit interval immediately following the arrival of the "1" representing output from the delay line. In consequence under said "1" representing line output conditions each MKD pulse will produce a sharp negative-going pulse at the anode of valve V506 and this is applied through capacitor C507 and diode D509 to the control grid of valve V507, charging the grid-cathode capacitor C508 in the process. The arrival of such negative-going pulse at the control grid of valve V507 thus initiates the commencement of a negative-going output pulse at output terminal 500. This pulse is maintained after the termination of the MKD pulse by virtue of the charging of the capacitor C508 and valve V507 remains in this condition until the arrival of the next MKB pulse, 9⁄10 microsecond later, through diode D508. This positive-going pulse serves to return the control grid potential of valve V507 to its initial, earthy value to terminate the negative output pulse from terminal 500. Thus there will be generated by the valves V506 and V507 a standard 9⁄10 microsecond negative-going digit pulse in response to the occurrence of a "1" representing potential level at the output of the delay line sections during the related digit interval; whenever the line output potential is lowered such pulses will be suppressed during the related digit intervals.

Such an arrangement of delay line and subsequent reshaping of the pulse output has the advantage of effectively providing an output waveform at terminal 500 which is of the "return-to-zero" type while allowing the use within the line and the associated amplifier valve circuits of a signal which is, effectively, of the so-called "non-return-to-zero" type. The latter, as is well known, has certain advantages from the aspects of transmission characteristics of the line and the associated circuitry, e.g. of requiring a more restricted band-width for proper transmission.

Figure 6:
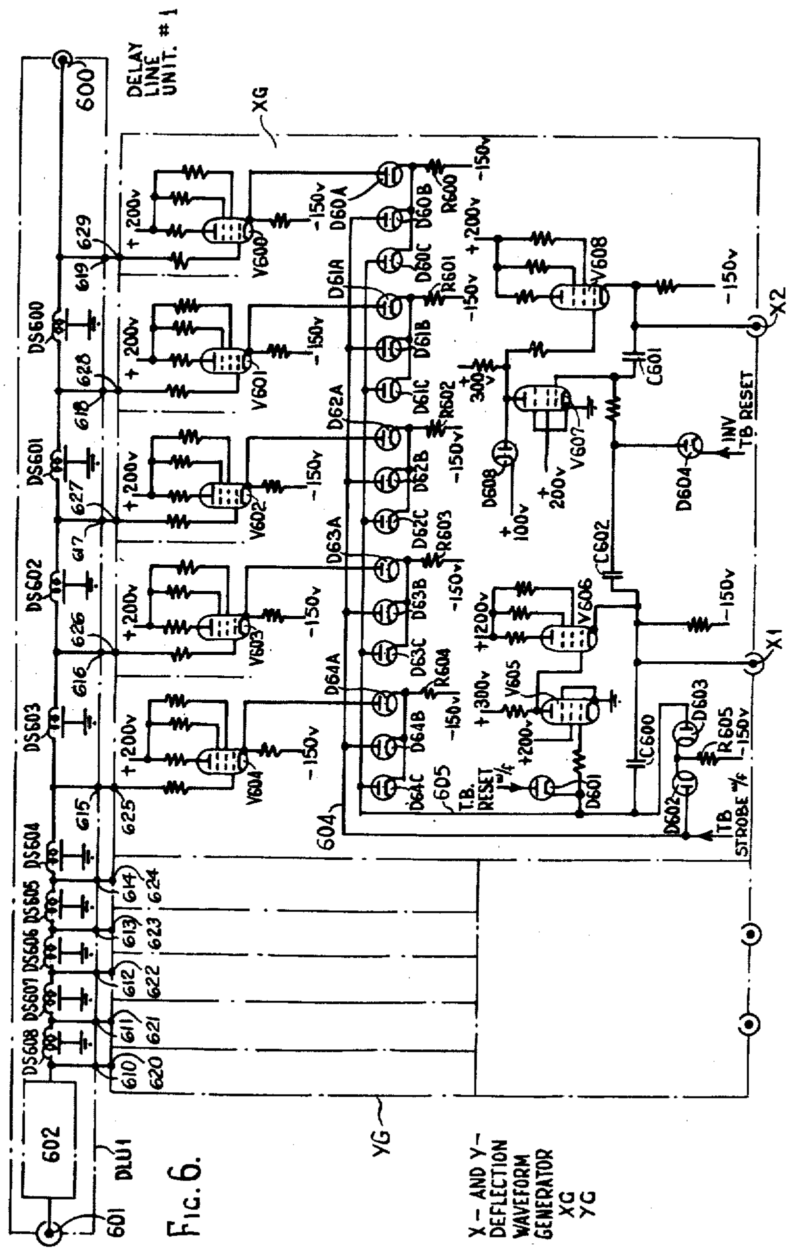
Fig. 6 is a circuit diagram illustrating the X- and Y-deflection waveform generator arrangements for the main store and its associated delay line.

The circuit arrangements of the X- and Y-deflection waveform generators XG and YG and the associated first delay line unit DLU1 are shown in Fig. 6.

The delay line unit DLU1 comprises a group of nine serially-connected delay line sections DS600 . . . DS608, each of 1 microsecond delay time. The input end of the line is connected to input terminal 600 and the output end thereof is connected to output terminal 601 through a reshaping circuit 602 whose form is similar to that of valves V505, V506 and V507 of Fig. 5.

The X-deflection waveform generator XG comprises five valves V600 . . . V604 each arranged as a cathode follower stage. The control grid of valve V600 is connected to the input end of the line section DS600 while the control grids of the other valves V601 . . . V604 are similarly connected to the further delay line sections DS601 . . . DS604. The cathode output point of valve V600 is connected to the anode of one diode D60A of a three-diode group whose cathodes are interconnected and joined to source of negative potential −150 v. through bleed resistor R600. The second diode D608 of the group is connected to lead 604 supplied with the TB Strobe waveform (Fig. 11*l*) while the third diode of the group is connected by way of lead 605 to the control grid of valve V605.

Further 3-diode groups D61A, B and C, D62A, B and C, D63A, B and C and D64A, B and C are arranged similarly with reference to valves V601, V602, V603 and V604 respectively. A further 2-diode group has one diode D602 connected by its anode to lead 604 and the other diode by its anode to lead 605. The bleed resistors R600, R601 . . . R605 have specially chosen values as explained later.

Valve V605 is arranged with valve V606 in a modified form of anode-follower circuit in which the Miller feed-back capacitor C600 is connected between the control grid of valve V605 and the cathode of valve V606, the latter being a cathode followed D.C. coupled to the anode of valve V605. The TB Reset waveform (Fig. 11*m*) is applied to the control grid of valve V605 through diode D601. Output terminal X1, connected to the cathode of valve V606, provides one version of the XTB waveform (see Fig. 11*n*).

An antiphase version of the same waveform is made available at output terminal X2 which is connected to the cathode of valve V608 arranged, with valve V607 in an anode follower circuit similar to that of valves V605, V606, the control grid of valve V607 being coupled through capacitor C602 to the cathode output point of valve V606. The INV TB Reset pulse waveform (Fig. 11*m*—antiphase) is fed to the control grid of valve V607 through diode D604.

The operation of the arrangement is as follows. The signals available at the outputs of the cathode follower valves V600 . . . V604 fed from the delay line are somewhat positive for "0" representing signals in the line and approximately −20 volts for "1" representing signals. The TB Strobe pulse fed by way of lead 604 to the second diodes (B) of each of the groups accepting the cathode follower outputs, is a negative-going 20 volt pulse from a resting level of +5 volts. The pulse is of ½ microsecond duration during digit interval *p*2.

To understand the operation of the circuit it is most convenient to consider first the reset condition. The positive-going pulse of the TB Reset waveform (Fig. 11*m*) causes the time base valve V605 to "bottom." After such pulse the control grid of valve V605 rests at a potential such that substantially no grid current is taken. The INV TB Reset pulse applied to valve V607 of the paraphase amplifier circuit of valves V607, V608 through diode D604 drives such valve V607 beyond cut-off.

When the TB Strobe pulse occurs, for each "1" (−20 v.) signal present along the delay line of sections DS600 . . . DS604 at any particular take-off cathode follower valve V600 . . . V604, current which normally flows from the −150 v. source through the associated load resistor R600 . . . R604 and the A and B diodes (whose anodes are then at a higher potential than that of the C diode) is diverted to the lead 605 connected to the control grid of valve V605 and capacitor C600 for the duration of the TB Strobe pulse. The increments of current which are fed to lead 605 under the control of the various digit signals in the delay line, are set by high stability resistors R600 (15 kiloohms), R601 (30 kiloohms), R602 (60 kiloohms), R603 (120 kiloohms) and R240 (240 kiloohms) and are thus proportional to the binary significance of the digit signals. When current is thus diverted for the duration of the TB Strobe pulse to the grid circuit of valve V605 a linear rise of potential is produced across capacitor C600 (47 micro-microfarads) and by the connection of such capacitor in a Miller feedback via the cathode follower valve V606, the magnitude of the potential built up across the capacitor C600 is determined by the input current and the TB Strobe pulse duration. On the termination of the TB Strobe pulse the current thus fed to the grid circuit of valve V605 is cut off and the capacitor C600 remains charged, the steady state of charge being maintained until the occurrence of the next TB Reset waveform pulse through diode D601. In order to ensure that, with all the possible magnitudes of current input to valve V605, substantially linear operation is obtained, a fixed increment of current controlled by a resistor R605 (33 kiloohms) is switched on every time by gate circuit of diodes D602, D603 irrespective of the digital configuration of the output potentials from the delay line unit DLU1.

The output from the cathode of valve V606 provides one deflecting voltage, e.g. as shown in Fig. 11*n*, and this is paraphased by valves V607, V608 which form a feedback amplifier having unity gain controlled by the capacitors C601, C602 (47 micro-microfarads). In order that one level on the paraphased output side may be defined precisely (the level on the X1 output side is defined precisely during reset by the control grid conditions of valve V605) it is arranged that during reset the valve V607 is cut off with the result that its anode potential rises and is caught at the defined level of +100 v. by the action of clamp diode D608. The INV TB Reset pulse is arranged to go to −6 volts only.

The arrangements of the Y-deflection waveform generator YG are identical, being controlled by the potentials at the terminals of the delay line sections DS605, DS606, DS607 and DS608. The push-pull Y TB waveforms resemble those of the X TB waveform already described and shown in Fig. 11*n*.

The delay line unit DLU2 is substantially identical in form with the first delay line unit DLU1 described above except that it includes only eight 1 microsecond delay line sections. There are, of course, no output terminals connected to the tapping points along the line and the latter may be formed as a single unit if desired.

Figure 7:
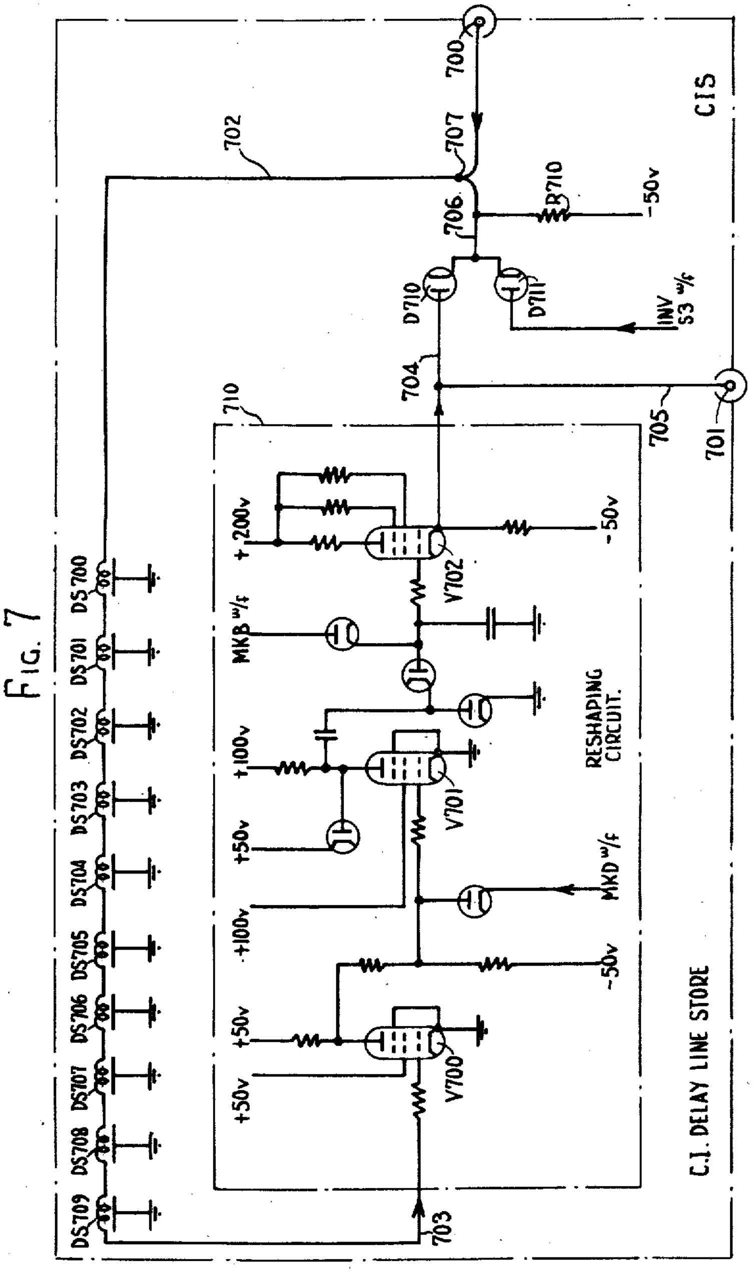
Fig. 7 is a circuit diagram showing the CI delay line store.

The arrangements of the C.I. delay line store CIS are shown in Fig. 7 and comprise a delay line consisting of nine 1 microsecond delay line sections DS700 . . .

DS708 arranged in series with a further ½ microsecond delay line section DS709. The input terminal 700 of the line is connected by way of buffer circuit 707 and lead 702 to the input end of the first line section DS700 while the output end of the last line section DS709 is connected by lead 703 to the input of a reshaping circuit 710. Such reshaping circuit is of a form comprising valves V700, V701 and V702 with ancillary apparatus arranged in substantially identical manner to that of valves V505, V506 and V507 of Fig. 5. The output from the reshaping circuit is fed by way of lead 705 to output terminal 701 and also by way of lead 704 to one diode D710 of a two-diode coincidence gate including second diode D711. The interconnected cathodes of the two diodes are joined in the usual way to one end of a load resistor R710 connected to source of negative potential −50 v. and also to another input of the buffer circuit 707.

The second diode D711 is continuously supplied with the INV S3 waveform which, since it is negative-going at all times except during beat S3 of each bar, provides for completion of the regenerative loop around the delay line except during beat S3 when the loop is interrupted. At this time a new input signal is being applied to input terminal 700 and it is necessary to erase the existing signal from the line. The total circulation time around the store is exactly 10 microseconds whereby a pulse train put into the store in one beat in synchronism with the digit intervals of the machine rhythm, can be withdrawn at the time of a later beat, still in synchronism with the machine rhythm.

Figures 8, 9, 10:
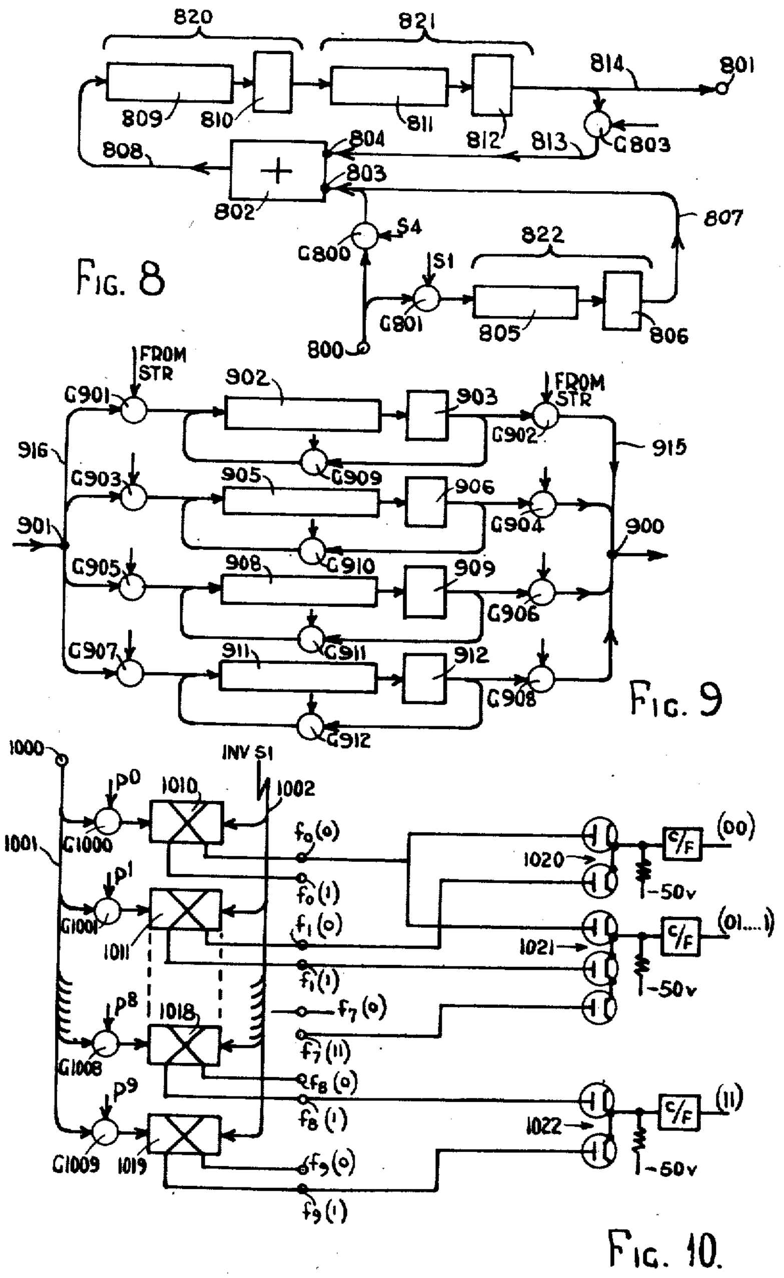
Fig. 8 is a schematic diagram illustrating the arrangements of a simple form of accumulator.
Fig. 9 is a schematic diagram illustrating a simple form of B-word store.
Fig. 10 is a partially schematic diagram showing the control staticisor arrangements of the machine.

A simple accumulator arrangement is shown schematically in Fig. 8 and comprises input terminal 800 connected by way of "And" or coincidence gate G800 direct to one input terminal 803 of an adding circuit 802. Such input terminal 800 is also connected by way of second "And" gate G801 to a 10 microsecond delay line 822 consisting of 9½ microsecond delay line 805 and an associated reshaping circuit 806. The output from the reshaping circuit on lead 807 is also supplied to the input terminal 803 of the adding circuit 802. The output from the adding circuit 802 is applied over lead 808 to a first 10 microsecond delay line 820 and thence to a second 10 microsecond delay line 821. Delay line 820 comprises 9½ microsecond line 809 and subsequent reshaping circuit 810 while delay line 821 consists of similar elements 811 and 812 respectively. The output from the second delay line 821 is fed over lead 814 to the output terminal 801 and also by way of gate G803 and lead 813 to the second input terminal 804 of the adding circuit 802.

Gate G803 is normally kept closed but is arranged to be opened whenever it is required to clear the accumulator of any existing signal content by application thereto of a suitable control voltage from the control staticisor STR. Gate G800 is controlled by the S4 waveform and is accordingly opened only during the S4 beat of a bar while gate G801 is controlled by the S1 waveform and is therefore opened only during the S1 beat of a bar.

In the operation of this accumulator with relation to the rest of the machine, a number destined for insertion therein occurs in two parts, as will be explained more fully later. The first part, consisting of the first 20 or least significant digits may arrive in beat S4 and will pass through gate G800 into the delay line loop. The second part, consisting of the second 20 or most significant digits will arrive in beat S1 of the next bar, i.e. two beats later. This part travels to the adding device 802 through the delay line 822 and thereby becomes delayed by another beat interval. This ensures that it will be placed, within the store, immediately behind the first part and will be properly combined with any "carry" digits that may have extended the initial 20 digit length of the first part.

The delay lines 820, 821 and 822 with their associated reshaping valves and the controlling gates may be substantially identical with the form of the corresponding parts of the C.I. store already described with reference to Fig. 7. The adding circuit may be of any convenient form, for example as described in "High Speed Computing Devices" by E.R.A. (published by McGraw-Hill, 1950) p. 277.

A simple form of B-word store is illustrated schematically in Fig. 9 as comprising four similar delay line devices each capable of storing one 10-digit word. The first device comprises a 9½ microsecond delay line 902 with an associated reshaping circuit 903, the regenerative loop being completed by way of, normally open, gate G909. The input to such device is from input terminal 901 through input busbar 916 and gate G901 while output therefrom is through gate G902 to output busbar 915 and thence to output terminal 900. The three remaining delay line devices are exactly similar, that of 905, 906 and G910 being controlled by gates G903 and G904, that of 908, 909 and G911 being controlled by gates G905 and G906 and that of 911, 912 and G912 being controlled by gates G907 and G908.

In operation, four different B- or instruction-modifying signal trains can be stored, one in each delay line device. Initial insertion of each of such B-word signals in such stores is effected by a machine operation involving the opening of the appropriate gate G901, G903, G905 or G907, which are normally closed, by potentials developed in the usual way by the staticisor STR under the influence of different combinations of the so-called *b* digits of a (P.I.) word fed to such staticisor. Similarly, selection of the appropriate one of the four stores for reading-out is effected in the same way by the same *b* digits. During insertion of a new B-word signal into any delay line device, the associated gate G909, G910, G911 or G912 is closed at the same time to erase any signal already present within the store.

The control staticisor STR is of conventional form and is as shown in Fig. 10. A group of ten bi-stable trigger circuits 1010, 1011 . . . 1019 have their resetting input terminals supplied with the differentiated INV S1 waveform whereby, if any circuit has been previously triggered, it will be reset at the end of beat S1 of a bar. The triggering input terminal of each trigger circuit is connected to the signal input terminal 1000 by way of an individual an individual gate G1000, G1001 . . .G1009 and lead 1001. Each gate is controlled by a different one of the group of *p*-Pulse waveforms *p*0, *p*1 . . . whereby the first trigger circuit 1010 will be triggered only if there is a "1" representing pulse at digit position *p*0 of the incoming signal train and so on.

In operation, each trigger circuit provides two alternate output voltages—one of these, known as the "0" output, is normally negative to about −30 v. for as long as the trigger circuit is in its normal reset condition and is at or a little above earth whenever the trigger circuit is in its triggered state. The other output known as the "1" output, is of reversed phase relationship, being at or above earth when the circuit is reset and negative when the circuit is triggered. The output terminals are indicated at *f*0(0), *f*0(1), *f*1(0), *f*1(1) . . . *f*9(1).

From such outputs, appropriate control potentials for the various gates and other devices whose operation is governed by the form of instruction signal supplied to terminal 1000, are derived from different coded combinations of the (*f*) digits of the applied signal through "decode" circuits such as those shown at 1020, 1021, 1022. Thus, decode circuit 1020, comprising a 2-diode coincidence gate and an associated cathode follower will provide a negative control potential output only when the *p*0 and *p*1 digits of the applied instruction are both of value "0." Similarly circuit 1021 requires that digit *p*1 is a "0" and digits *p*2 and *p*7 are both value "1." Circuit 1022 requires digits *p*8 and *p*9 to be both of value "1" before a negative control potential is provided therefrom.

Such digits *p*8 and *p*9 are used for selecting which of the four B-word stores are to be used.

The gate circuits G1 . . . G9 may be of any convenient form, for example, multiple diode type coincidence gates as described in the aforesaid reference of "Electronics," Sept. 1948, p. 110. Gate G1 is a three-input gate controlled by the INV S1 and and INV S3 waveforms whereby it is opened in all beats except S1 and S3. Gate G2 is a two-input gate controlled by the S3 waveform to be open only during beat S3. Gate G3 is similar to G2 except that it is opened only during beat S1. Gate G4 is a three input gate controlled by a function code signal from the staticisor STR and either the S1 or S4 waveforms whereby it is opened in beats S1 and S4 provided the instruction being obeyed is one requiring transfer into the accumulator A. Gate G5 is also a three input gate controlled by a function code signal and either of the S3 and S4 waveforms whereby it is opened in beats S3 and S4 provided the instruction being obeyed in one calling for transfer into the main store MS. Gate G6 is a two-input gate controlled by the S2 waveform to be opened only during beat S2. Gate G7 is similar to gate G6 except that it is opened only during beat S3. Gate G8 is similar to gate G7 while gate G9 is a triple input gate controlled by a function code signal and either of the S1 or S4 waveforms to be opened in beats S1 and S4 only when a transfer from the main store MS into the B-word store BS is called for.

The adding circuit ADR may be of any convenient type capable of dealing with the serial pulse train signals used in the machine. One example is given in the previously quoted reference "High Speed Computing Devices" by E.R.A. p. 277. In that circuit, the output and input "carry-digit" terminals (C,C′) are interconnected through a 1 microsecond delay section and the *p*0-pulse waveform additionally supplied to the "carry" input terminals.

The control loop CL is arranged, by suitable addition of delay line sections to the adding circuit ADR to have a total delay time therein of exactly 20 microseconds whereby 2 10-digit pulse trains may be accommodated therein end to end.

In beat S1, at the commencement of digit-interval *p*0, a Scan Control pulse train (SC) circulating around the loop CL has nearly entered the first delay line unit DLU1 and becomes properly registered within the delay line elements thereof at the beginning of digit interval *p*2. At this instant the pulse of the TB Strobe waveform (Fig. 11*l*) causes operation of the associated X- and Y-deflection waveform generators XG and YG to set up the required X- and YTB waveform potential levels necessary to select the next storage location (*s*) in each storage tube C0 . . . C9 which is due for regeneration which thereafter takes place in the manner previously described under the control of the Dot, Dash, Stroke and D/F waveforms (Figs. 11*f*, 11*g*, 11*h* and 11*i*) during the remaining digit-intervals *p*4 . . . *p*9 of the beat.

Gate G1 is closed so that no input signal to the write input control unit WIU can influence the proper regeneration of the already existing signals stored in the various tubes while gates G4, G6, G7 and G9 are similarly closed to prevent any signal train developed in the read output control unit ROU from passing outwardly therefrom.

Simultaneously with the above described store regeneration, any existing second pulse train circulating within the loop CL (probably the last previously employed Present Instruction (PI) number signal) has entered the second delay line unit DLU2 and commences to emerge from output terminal 106 thereof in exact time synchronism with the *p*0 . . . *p*9 digit intervals of the machine rhythm. This issuing train is, however, suppressed by the closure of gates G1 and G2 and becomes dissipated. At the same time, however, gate G3 is opened and a Control Instruction (CI) pulse train, previously stored in and circulating around the CI delay line store CIS, emerges from its output terminal 701 in exact time synchronism with the related digit-intervals *p*0 . . . *p*9 of the S1 beat.

This CI pulse train signals the address location (*c*) within the main data store MS of the last used Present Instruction (PI) and, as it is fed by way of lead 108 and input terminal 109 to the adding circuit ADR, has such CI number effectively increased by one due to the simultaneous application of the *p*0-pulse over lead 115 into the carry-digit loop 113 of the adding circuit. The altered CI pulse train (representing location $c+1$) thus emerges from output terminal 110 and begins to enter the first delay line unit DLU1 immediately behind the previous SC pulse train.

In the next beat A1, the CI pulse train replaces the previous SC pulse train within the first delay line unit DLU1, the latter train having moved on into the second delay line unit DLU2 from which it begins to emerge at digit interval *p*0 in exact synchronism with the machine rhythm. The CI pulse train becomes accurately registered within the delay line elements of unit DLU1 at the beginning of digit-interval *p*2 whereupon, by operation due to the TB Strobe waveform (Fig. 11*l*) the associated X- and Y-deflection waveform generators XG and YG, which have just previously been reset back to their zero level by the arrival of the pulse of the TB Reset waveform at instant *p*1, become set up to the new deflection levels for selecting the storage address location $(c+1)$ of the first 10 digits of the required PI word.

Operation of the main data store MS proceeds in the usual way throughout the beat, the pulse of the Write Strobe waveform (Fig. 11*j*) being again ineffective due to the absence of any signal within the write input control unit WIU owing to continued closure of gate G5. The subsequent pulse of the Read Strobe waveform (Fig. 11*k*) at digit interval *p*8 of the beat, however, causes the generation within the read output control unit ROU of a pulse train representing the required first 10-digit portion of the PI word. This PI(1) pulse train immediately commences to pass outwards but owing to the additional delay incorporated within the unit, it does not commence to emerge from output terminal 500 until the first digit interval *p*0 of the next beat S2.

In the meantime the previous SC pulse train emerging from output terminal 106 of second delay line unit DLU2 is passed by way of lead 107, gate G1 (now opened) and lead 108 to the adding circuit ADR where, by the coincident arrival of the *p*0-pulse on lead 115, its number value is increased by one to represent the next storage location in order $(s+1)$ to be regenerated in the following scan beat S2. Such altered SC pulse train, on emerging from output terminal 110 of the adding circuit, flows into the first delay line unit DLU1 immediately behind the preceding CI number pulse train.

In the next following beat S2, the serialised first 10 digits of the PI word (which define the function which is to be performed during the current major cycle or bar) emerge from output terminal 500 of read output unit ROU and pass by way of, now opened, gate G6 into the control staticisor STR whose individual sections become set up in accordance with the signalled digit values in the corresponding digit positions of the arriving pulse train. In consequence a series of static voltage outputs of appropriate values becomes available on the output leads from the different staticisor sections. These voltages are used to provide gate controlling potentials for the different gates G5 and G9 so as to open or close the latter in accordance with the nature of the particular function which is required to be performed. Thus, if the function digits signal an operation involving transfer from the main data store MS to the accumulator A, the gate G4 will be opened and the remaining gates G5 and G9 closed. If, on the other hand, the function digits call for a transfer from the accumulator A to the main data store MS then only gate G5 is opened.

In the meantime the new SC pulse train $(s+1)$ has become properly registered within the first delay line unit DLU1 and operates the X- and Y-deflection generators XG and YG to cause regeneration of the storage location next in order from that regenerated in beat S1. Simultaneously the CI pulse train, which will have reached the second delay line unit DLU2 by the end of the previous beat A1, begins to emerge from output terminal 106 of such unit and flows by way of lead 107, still-opened gate G1 and lead 108 to the adding circuit ADR where it will again be increased in value by one due to the applied *p*0-pulse so as to represent address $(c+2)$ where the second 10-digit portion of the required PI is stored. This portion defines the address in main data store MS of the first 10-digit storage location to be either the source of or the destination for the first 10 digits of the actual computation number. This altered CI pulse train emerges from output terminal 110 of the adding circuit and commences to flow into the first delay line unit DLU1 behind the preceding SC number train.

In the next beat A2, the CI pulse train (representing store address c+2) becomes properly registered in the first delay line unit DLU1 at digit interval *p*2 and at this time the pulse of the TB Strobe waveform (Fig. 11*l*) causes the usual "flash-over" of control potentials to the X- and Y-deflection waveform generators XG and YG to set up the X- and Y- TB waveforms (previously reset to zero level at digit-interval *p*1 by the TB Reset waveform, Fig. 11*m*) to the levels required to select the address location of the second 10-digit portion of the PI word. This portion, PI(2), defines the address location from which the first 10 digits of the number word being handled in the computation is to be read out. At the time of digit-interval *p*8 of the same beat, the pulse of the Read Strobe waveform causes operation of the read out control unit ROU to generate a serialised version of the stored digits at such address location $(c+2)$ within the delay line of unit ROU. This serialised pulse train then commences to flow from the unit ROU but owing to the included additional delay, it begins to issue from output terminal 500 only at digit interval *p*0 of the next beat S3.

In the meantime, the SC pulse train has issued from the second delay line unit DLU2 through output terminal 106 and has passed by way of lead 107, still-opened gate G1 and lead 108 to the input terminal 109 of the adding circuit ADR where, by the coincident application of the *p*0-pulse on lead 115 its number value has again been increased by one to represent the next address location $(s+2)$ due for regeneration. The altered SC pulse train issuing from output terminal 110 of the adding circuit ADR then flows into the first delay line unit DLU1 through input terminal 600 immediately behind the trailing end of the preceding CI pulse train. The latter passes out of the first delay line unit DLU1 into the second delay line unit DLU2 and its leading end reaches the output terminal 106 of the latter in time to issue therefrom in synchronism with the instant of commencement of the next beat S3.

In beat S3, the altered SC pulse train becomes properly registered in the first delay line unit DLU1 at the time of digit interval *p*2 and by a repetition of the above described operation under the control of the TB Reset and TB Strobe waveforms, regeneration of the address location $(s+2)$ is effected.

In the meantime, the CI pulse train previously located in the second delay line unit DLU2 begins to issue from output terminal 106. Gate G1 is now closed and gate G2 opened instead whereby such CI pulse train (representing address location $c+2$) passes by way of lead 118 into the CI delay line store CIS which is cleared of any previous content at the same time by opening its regenerative loop at its included gate of diodes D710, D711 . . . (Fig. 7). The output gate G3 in lead 120 from the store CIS is kept closed so that, by closure of its internal gate, at the end of the beat, the CI pulse train begins to circulate around the store in readiness for subsequent use.

Simultaneously, the second 10-digit section of the selected PI word, begins to issue from output terminal 500 of the read out control unit ROU in synchronism with the digit intervals *p*0 . . . *p*9 of the beat and is fed through now-opened gate G7 and lead 130 to the input terminal 109 of the adding circuit ADR whereby it effectively takes the place of the CI pulse train (now diverted to store CIS) within the control loop CL.

Such second section of the PI word defines the address location in the main store MS of the first 10 digits of the required number word. However, as its value will automatically be increased by one upon passage through the adding circuit ADR by a repetition of the action previously described, the number signal initially stored in the address $(c+2)$ from which it is withdrawn is deliberately made one less than the correct value. During its passage through the adding circuit ADR such PI pulse train may be further modified by the feeding to the second input terminal 112 of the adding circuit of a B-word signal train drawn from the output bus-bar 801 of the B-word store BS by way of lead 122, now opened gate G8 and lead 121. The exact nature of such B-word signal is determined by the particular one of the various B-word storage sections which has been selected for use by control potentials derived through the control staticisor STR from the *b* digits of the first 10 digits of the selected PI word which were sent to the staticisor in beat S2. Such amended PI(2) pulse train proceeds by way of output terminal 110 and lead 111 to input terminal 600 and enters the first delay line unit DLU1 so as to follow the SC pulse train now passing to the second delay line unit DLU2. The last mentioned pulse train reaches the output terminal 106 of the unit DLU2 at the end of the beat in readiness to emerge in synchronism with the next beat A3.

Gates G4 and G6 are kept closed during this beat but gate G5 may or may not be opened in dependence upon whether the required transfer operation which is about to take place is to be into or out of the main store MS. If the transfer is to be out of the store then gate G5, although released for opening by the S3 waveform, will still remain inhibited by the absence of the correct combination of *f* digit values set up on the staticisor STR. If, on the other hand, such *f* digit values are such as to signal for an inward transfer then gate G5 will open during the beat S3 to allow a pulse train output from a selected one of the accumulator storage elements to pass by way of lead 124 to the write input control unit WIU where it will be used in the next following beat A3 to control writing into the main data store MS.

In the next following beat A3 the amended PI(2) pulse train becomes properly registered in the first delay line unit DLU1 at digit interval *p*2 and by the usual operation of the TB Reset and TB strobe waveforms, causes deflection of the store tube beams to the address location $(n+1+b)$ required for use with the first 10 digits of the number word. If the operation signalled by the original *f* digits of the PI(1) word calls for inward transfer, the number signal train fed during the previous beat S3 from the accumulator A will become properly registered in the delay line of the write-input control unit WIU at the time of digit interval *p*4 and the pulse of the Write Strobe waveform (Fig. 11*j*) will cause the appropriate write-in voltages to be flashed over to the read/write circuits of each storage tube thereby writing in the applied number signal. The erase inputs of each storage tube regenerative circuit will, under such conditions be driven negative by the Erase waveform (Fig. 2).

If, on the other hand, the signalled operation by the *f* digits of the PI(1) word calls for outward transfer, then at the time of digit interval *p*8, the Read Strobe waveform (Fig. 11*k*) will cause the generation of a serialised version of the stored signal at the selected address location in the main store MS within the read output control unit ROU and this will begin to move towards the output terminal 500 thereof in readiness to emerge at the beginning of the next beat S4.

Meanwhile the SC pulse train has been emerging from output terminal 106 of the second delay line unit DLU2 and has passed by way of lead 107, gate G1 and lead 108 to the adding circuit ADR where its number value is again increased by one before passing on to the input terminal 600 of the first delay line unit DLU1 where it follows immediately behind the trailing end of the departing PI(2) pulse train which has, by the end of the beat, moved completely into the second delay line unit DLU2.

In the next beat S4, the SC pulse train (representing address $s+3$) becomes properly registered at digit interval *p*2 of the beat and the action of the TB Reset and TB Strobe waveforms cause regeneration of that address location within the store to take place.

Meanwhile, if the signalled function is an outward transfer, the generated pulse train within the read out control unit ROU representing the first ten digits of the number, emerges from output terminal 500 and passes by way of lead 127 and gate G4 to the input terminal 801 of the accumulator A for insertion thereinto.

Simultaneously the PI(2) pulse train begins to emerge from the second delay line unit DLU2 and passes by way of lead 107, gate G1 and lead 108 to the adding circuit ADR where its number value is again increased by one to represent the address location $(n+1)$ of the second 10-digit portion of the required number. After such alteration it proceeds to flow into the first delay line unit DLU1 immediately behind the trailing end of the previous SC pulse train.

In this beat, gates G2, G3, G6 and G7 remain closed as also does gate G5 unless the signalled function set up by the *f* digits of the PI(1) train on the staticisor STR call for inward transfer. In such event, gate G5 is opened to allow the contents of the accumulator to pass from the output terminal busbar 800 of such accumulator to the input terminal 401 of the write input control unit WIU in readiness for insertion within the main data store MS during the following beat A4.

In the next beat A4, the altered PI(2) pulse train becomes properly registered in the first delay line unit DLU1 at digit-interval *p*2 and, under the influence of the TB Reset and TB Strobe waveforms, cause selection of the address location $(n+1)$ of the second 10-digit portion of the required number. If the signalled function is an inward transfer, the Write Strobe waveform pulse in digit interval *p*4 will cause the flashing over of the appropriate write in potentials from the write-input control unit WIU to the related read/write circuits of the various tubes in accordance with the pulse signal values of the input pulse train fed to such unit WIU from the accumulator A during the preceding beat S4. If, on the other hand, the signalled function is an outward transfer to the accumulator, then the read output control unit ROU will be operated under the influence of the Read Strobe waveform pulse in digit interval *p*8 of the beat to form a serialised pulse train within its delay line representing the stored number. This pulse train then commences to flow towards the output terminal 500 in readiness to emerge from the latter in synchronism with the next following beat which is beat S1 of the next bar.

Meanwhile the SC pulse train is emerging from output terminal 106 of the second delay line unit DLU2 and passes once more to the adding circuit ADR by way of lead 107, gate G1 and lead 108. Within the adding circuit its number value is again increased by one to represent the next address location ($s+4$) due for regeneration and it then passes to the input terminal 600 of the first delay line unit DLU1 where it flows in immediately behind the departing PI(2) pulse train.

The next beat marks the commencement of an entirely new operative major cycle or bar for dealing with the next following instruction word of the programme and the events thereafter are a repetition of those already described. This beat however also forms the final beat of the preceding bar just described and the period can therefore be regarded as one of an overlapping beat [S5] of the first bar and beat S1 of the next bar.

The S5 beat operation comprises the passage of the serialised second 10-digit portion of the required number train from output terminal 500 of unit ROU by way of lead 127 and gate G4 (opened by the S1 waveform) to the input busbar 801 of the accumulator A. This operation only takes place if the signalled function of the previous beat is one of outward transfer.

The modified form of the combined accumulator and "B" number store, shown in Fig. 12, comprises three delay line registers DL10, DL11 and DL12 and at least one and preferably several arithmetic circuits such as the adding circuit AD2 available for association with any one of these registers. The use of a common arithmetic circuit in association with several registers introduces difficulty in that provision must be made to insert an appropriate extra delay element in place of an arithmetic circuit when the arithmetic circuit is dissociated from a register. This difficulty is overcome by providing what is in effect a special B accumulator. This B accumulator may be regarded as the adder AD2 or a subtractor (or possibly other logical circuits) which is built out to have a complete word time (10 digit) delay instead of the approximate 1 digit delay of an arithmetic circuit alone. This B accumulator would be made up of the selection of arithmetic and logical circuits plus a reshaping circuit RS connected by 8½ microseconds of delay line DLX; the total delay being 10 microseconds. This accumulator is associated with the B registers as is illustrated in Fig. 12, the registers having common input busses 60, 61 with gates G60 . . . G65 controlled by the B address digits set up on part of the function staticisor CST. It will be seen that the B registers themselves are complete and are capable of storing 10 digit numbers, which may be made available at the output buss 61 as required. When it is required to perform any arithmetic or logical operation with a number in a B register, the B register is in effect connected in series with the B accumulator, so that the modified B number, after passage through the B accumulator, is reinserted into the B register exactly 1 word interval later.

Such B accumulator may very conveniently be arranged to perform also part of the function of the main accumulator A of the machine. If it is assumed that the main accumulator of the machine comprises, say, eight 10 microseconds delay line sections or four 20 microseconds delay line sections, each section will necessarily be closed upon itself and represents a self-contained 10 or 20 digit store. The arithmetic circuits and delay of the B accumulator may thus easily be associated with the sections of the main accumulator, and it will be apparent that, in view of the inflexible scan action rhythm of the machine, the 10 digit groups held in the (for example) eight sections of the main accumulator cannot be run together, but must always be separated by 10 digit scan intervals. During these intervals, the 10 digit delay of the B accumulator comes into play and the appropriate result from each 10 digit section of the main accumulator finds its way back into that section of the accumulator with the appropriate timing.

This combination is illustrated in Fig. 12 where eight 10-microsecond delay lines DL13 . . . DL20 constitute the accumulator registers. These lines are complete in themselves and also have their respective input and output terminals connected by way of gates G66—G73 and gates G74—G81 respectively to the input and output busses 60, 61 of the previously described "B" store.

Various alterations and modifications may obviously be made without departing from the scope of the invention as set out in the following claims.

We claim:

1. An electronic digital computing machine comprising computing circuit means arranged for operation in the series mode with word signals in which the $x$ digits of a word are represented by electric pulses in $x$ sequential digit time intervals, said computing circuit means including an input conductor and an output conductor for receiving and delivering said series mode word signals, first timing means for controlling the operation of said computing circuit means at a digit signalling speed having digit time intervals of predetermined duration, a data storage device arranged for operation in the parallel mode and having $x$ separate write-in and read-out conductors, one for each of said word digits for receiving input signals and providing output signals in parallel form, second timing means for controlling the writing-in and reading-out operation cycles of said data storage device, said second timing means being arranged to cause each of said writting-in or reading-out operation cycles to extend over a predetermined plurality of said digit time intervals of said serial mode digit signalling speed, parallel-to-series signal conversion means connected between the read-out conductors of said data storage device and the input conductor to said computing circuit means and series-to-parallel signal conversion means connected between the output conductor of said computing circuit means and the write-in conductors of said data storage device, said data storage device including in each of its write-in conductors input signal setting means for controlling the form of the input signals written in said data storage device by means of an input signal pulse occurring in one only of said digit time intervals of said serial mode digit signalling speed and each of said read-out conductors of said data storage device including read-out signal sampling means for providing an output signal limited in duration to one only of said digit time intervals of said serial mode digit signalling speed whereby the writing-in and reading-out operations within such data storage device are at a signalling speed several times slower than that of said computing circuit means.

2. An electronic digital computing machine according to claim 1 in which said main data storage device comprises a plurality of separate cathode ray storage tubes each arranged to store one digit signal of said word signal and which includes common address selecting apparatus having a control signal input and which is interconnected with all of said storage tubes for simultaneously locating one digit storage location in each tube in accordance with a serial-form address control signal applied to said control signal input and a continuously operating closed signal storage loop for retaining a circulating control signal for controlling said address selecting means, said storage loop being connected to supply said control signal to said control signal input and including signal altering means for altering the form of said control signal to select a different storage location in said main data storage device at each circulation of such control signal around said storage loop.

3. An electronic digital computing machine according to claim 2 which includes rhythm control apparatus for said cathode ray tube storage device to cause operation thereof upon a rhythm of alternate scan (regeneration) and action (operation) beats and in which said closed signal storage loop is arranged to hold two serially disposed serial-form circulating address control signals whereby one of said address control signals serves to control said address selecting apparatus during scan beats and the other of said address control signals serves to control said address selecting apparatus during action beats.

4. An electronic digital computing machine according to claim 3 in which said signal altering means comprises an adding device and which includes a source of alteration signals connected to said adding device for supplying in coincidence with the passage of said scan beat address control signal therethrough, a signal which alters the selected address location by unity at each circulation of said scan beat address control signal around said storage loop to effect systematic regeneration of each address location in turn in each of said storage tubes during successive scan beats.

5. An electronic digital computing machine according to claim 4 in which said source of alteration signals is arranged to supply similar alteration signals to said signal altering device in coincidence with the passage of the action beat address control signal therethrough to allow a number of sequential address locations subsequent to a particular address location determined by the initial form of said action beat address control signal each to be made available in turn in successive action beats.

6. An electronic digital computing machine according to claim 5 in which said address control signals are in the form of electric pulse signal trains and in which said signal storage loop comprises an electric delay line device having a plurality of tapping points thereon and a plurality of separate voltage sensitive means connected one to each of said tapping points for deriving a plurality of parallel form signals each determined by the form of a different one of the pulse signals in said pulse train while in transit through said delay device.

7. An electronic digital computing machine according to claim 6 wherein said closed signal storage loop includes electric switch-controlled alternative by-paths, one of which includes a subsidiary address control signal storage device.

8. An electronic digital computing machine according to claim 4 which includes a further source of address-modifying signals and circuit means including signal-controlled gate means connecting said further source to said adding device, said gate means being controlled by a signal derived from said rhythm control apparatus for applying a modifying signal to said adding device in coincidence with the passage of an action beat address control signal therethrough.

9. An electronic digital computing machine according to claim 8 in which said further source of address-modifying signals consists of a subsidiary store having input and output terminals and comprising a plurality of separate word storage devices, each including an electromagnetic delay line having an input and an output and arranged within a regenerative loop including a pulse signal reshaping circuit, and signal controlled switching means for connecting the input of any one of said word storage devices to the subsidiary store input terminal and for connecting the output of any one of said storage devices to the subsidiary store output terminal.

10. An electronic digital computing machine according to claim 9 wherein said subsidiary store comprises means for altering the form of any signal held within any one of said word storage devices, said means including an arithmetical circuit connected in series with an electric delay device having a delay time sufficient to make the overall delay time of signal transmission through said altering means equal to an integral number of basic word-signal times of the serial-mode machine signalling rhythm, said means being connected between said subsidiary store output and input terminals.

11. An electronic digital computing machine according to claim 10 wherein said accumulator and said subsidiary store are combined as a single unit with said altering means of said subsidiary store with its included arithmetical circuit arranged also to serve said accumulator delay line store.

12. An electronic digital computing machine according to claim 2 wherein each of said separate cathode ray storage tubes includes a write-in conductor and a read-out conductor and wherein said parallel-to-series signal conversion means comprises a plurality of electric delay line sections each having a delay time equal to the pulse interval of said pulse train form of signal and circuit means connected between each of the junction and end terminals of said plurality of electric delay line sections and different individual ones of said read-out conductors of said storage device for simultaneously setting the potential at each of said junction and end terminals of said delay line sections at one or the other of two levels in dependence upon the potential level of the related read output signal from said storage device for a period not exceeding that of one pulse interval.

13. An electronic digital computing machine according to claim 12 wherein said series-to-parallel conversion means comprises a plurality of electric delay line sections each having a delay time equal to the pulse interval of said pulse train form of signal and circuit means connected between each of the junction and end terminals of said plurality of electric delay line sections and different individual ones of said write-in conductors of said storage device for instantaneously testing the potential at each of said terminals of said delay line sections and in accordance with the result of such test, applying an appropriate input signal to the related write-in conductor of said storage device.

14. An electronic digital computing machine according to claim 1 in which said computing circuits include an accumulator comprising an electromagnetic delay line arranged within a regeneration loop including a pulse reshaping circuit and an arithmetical circuit having a second input terminal for effecting combination of a number-representing pulse train circulating around said loop with a further external number-representing pulse train applied to said second input terminal.

15. An electronic digital computing machine arranged for operation with a word length of $x$ digits and comprising at least one computing circuit arranged for operation with serial mode word signals in which each of the $x$ digits are represented by an electric pulse signal in $x$ sequential digit time intervals, said computing circuit having a single input conductor means and a single output conductor means on which the word representing signals are provided in serial pulse train form, first timing means for controlling the operation of said computing circuit with digit time intervals of predetermined length, a data storage device arranged for operation with parallel mode signals and having $x$ separate write-in and read-out conductors, one for each word digit for receiving and providing digit signals in parallel form, second timing means for controlling the operation of said main data storage device to effect writing-in and reading-out cycles thereof, said second timing means being arranged to cause each of said writing-in or reading-out operation cycles to extend over a time period embracing $x$ of said sequential digit time intervals of said serial mode signals, parallel-to-series signal conversion means connected between the read-out conductors of said data storage device and the single input conductor means of said computing circuit, series-to-parallel signal conversion means connected between the single output conductor means of said computing circuit and the write-in conductors of said data storage device, control means in each of the write-in conductors of said data storage device for controlling the written-in signal value during each writing-in operation cycle of said data storage device in accordance with an applied write-in pulse signal of a duration not greater than one digit time interval of said serial mode signals and signal testing means in each read-out conductor of said data storage device for sampling the read-out signal during a read-out operation cycle of said data storage device and providing therefrom a pulse signal during one only of said digit time intervals of said serial mode signals.

16. An electronic digital computing machine comprising computing circuit means arranged for operation in the series mode with word signals in which the $x$ digits of a word are represented by electric pulses in $x$ sequential digit time intervals, said computing circuit means including an input conductor and an output conductor for receiving and delivering said series mode word signals, first timing means for controlling the operation of said computing circuit means at a digit signalling speed having digit time intervals of predetermined duration, a data storage device arranged for operation in the parallel mode and having $x$ separate storage elements, each of said elements having a plurality of separate storage addresses and individual write-in and read-out conductors, one for each of said word digits, and common address selecting apparatus operative simultaneously on each of said storage elements to locate a similar storage address in each for receiving input signals and providing output signals in parallel form on said write-in and read-out conductors respectively, second timing means synchronized with said first timing means for controlling the writing-in and reading-out operation cycles of said data storage device, said second timing means being arranged to cause each of said writing-in or reading-out operation cycles to extend over $x$ of said digit time intervals of said serial mode digit signalling speed, parallel-to-series conversion means connected between the read-out conductors of said data storage device and the input conductor to said computing circuit means and series-to-parallel conversion means connected between the output conductor of said computing circuit means and each of the write-in conductors of said data storage device, each of said write-in conductors including input signal control means for controlling the form of the input signal written in the associated storage element of said data storage device by means of an input signal pulse occurring on said write-in conductor during one only of said digit time intervals of said serial mode digit signalling speed and each of said read-out conductors including read-out signal sampling means for providing an output signal limited in duration to one only of said digit time intervals of said serial mode digit signalling speed whereby the writing-in and reading-out operations within such data storage device are at a signalling speed $x$ times slower than that of said computing circuit means.

17. An electronic digital computing machine arranged for operation with a word length of $x$ digits and comprising at least one computing circuit arranged for operation with serial mode word signals in which each of the $x$ digits are represented by an electric pulse signal in $x$ sequential equal length digit time intervals, said computing circuit having a single input conductor and a single output conductor on which the word representing signals are provided in serial pulse train form, first timing means for controlling the operation of said computing circuit with digit time intervals of predetermined length, a main data storage device arranged for operation with parallel mode signals and having $x$ digit storage elements, each of said elements having a plurality of separate digit storage locations and each having separate write-in and read-out conductors for receiving and providing digit signals in parallel form, second timing means for controlling the operation of said main data storage device to effect writing-in and reading-out operation cycles in each of said storage elements simultaneously, said second timing means being arranged to cause each of said writing-in or reading-out operation cycles to extend over a time period embracing a plurality of said $x$ sequential digit time intervals of said serial mode signals, parallel-to-series signal conversion means interconnecting each of the read-out conductors of said main data storage device with the single input conductor of said computing circuit, series-to-parallel signal conversion means interconnecting the single output conductor of said computing circuit with each of the write-in conductors of said main data storage device, control means in each of the write-in conductors of said main data storage device for controlling the written-in signal value during each writing-in operation cycle of each of said storage elements in accordance with an applied write-in pulse signal of a duration not greater than one digit time interval of said serial mode signals and signal testing means in each read-out conductor of said main data storage device for sampling the read-out signal during a read-out operation cycle of each of said storage elements and providing therefrom a pulse signal during one only of said digit time intervals of said serial mode signals.

References Cited in the file of this patent

UNITED STATES PATENTS

| | | |
|---|---|---|
| 2,429,228 | Herbst | Oct. 21, 1947 |
| 2,604,262 | Phelps et al. | July 22, 1952 |
| 2,634,052 | Block | Apr. 7, 1953 |
| 2,739,299 | Burkhart | Mar. 20, 1956 |
| 2,767,908 | Thomas | Oct. 23, 1956 |

OTHER REFERENCES

National Bureau of Standards "Technical News Bulletin," vol. 34. No. 9, September 1950, article entitled "SEAC," pages 1 to 3.

"Proceedings of Conference on Automatic Computing Machines," Univ. of Sydney, August 1951, Fig. 5, pages 163–171.